United States Patent
Singhal et al.

(10) Patent No.: US 7,096,418 B1
(45) Date of Patent: Aug. 22, 2006

(54) DYNAMIC WEB PAGE CACHE

(75) Inventors: Vivek Singhal, Sunnyvale, CA (US); Ian Emmons, San Jose, CA (US); Richard Jensen, Redwood City, CA (US)

(73) Assignee: Persistence Software, Inc., San Mateo, CA (US)

( * ) Notice: Subject to any disclaimer, the term of this patent is extended or adjusted under 35 U.S.C. 154(b) by 1116 days.

(21) Appl. No.: 09/591,986

(22) Filed: Jun. 12, 2000

Related U.S. Application Data

(60) Provisional application No. 60/179,811, filed on Feb. 2, 2000, provisional application No. 60/201,166, filed on May 2, 2000.

(51) Int. Cl.
*G06F 17/00* (2006.01)
(52) U.S. Cl. .................................. 715/501.1; 711/133
(58) Field of Classification Search ............. 715/501.1, 715/501; 709/219, 229, 203, 216; 711/163, 711/133, 141, 122, 134; 707/10, 103 R
See application file for complete search history.

(56) References Cited

U.S. PATENT DOCUMENTS

| | | | | |
|---|---|---|---|---|
| 5,220,657 A | * | 6/1993 | Bly et al. ................... | 711/152 |
| 5,499,371 A | * | 3/1996 | Henninger et al. ......... | 717/108 |
| 5,615,362 A | | 3/1997 | Jensen et al. ............... | 395/614 |
| 5,793,966 A | * | 8/1998 | Amstein et al. ............ | 709/203 |
| 5,978,828 A | * | 11/1999 | Greer et al. ................ | 709/224 |
| 6,003,087 A | * | 12/1999 | Housel et al. .............. | 709/229 |
| 6,185,608 B1 | * | 2/2001 | Hon et al. ................... | 709/216 |
| 6,216,212 B1 | * | 4/2001 | Challenger et al. ......... | 711/163 |
| 6,249,844 B1 | * | 6/2001 | Schloss et al. .............. | 711/122 |
| 6,272,595 B1 | * | 8/2001 | Rosen et al. ................ | 711/128 |
| 6,272,598 B1 | * | 8/2001 | Arlitt et al. ................. | 711/133 |
| 6,289,358 B1 | * | 9/2001 | Mattis et al. ............... | 707/203 |
| 6,351,767 B1 | * | 2/2002 | Batchelder et al. ......... | 709/219 |
| 6,408,360 B1 | * | 6/2002 | Chamberlain et al. ...... | 711/124 |
| 6,574,715 B1 | * | 6/2003 | Challenger et al. ......... | 711/141 |
| 6,584,548 B1 | * | 6/2003 | Bourne et al. .............. | 711/134 |
| 6,622,168 B1 | * | 9/2003 | Datta ......................... | 709/219 |
| 6,640,240 B1 | * | 10/2003 | Hoffman et al. ............ | 709/203 |
| 6,744,452 B1 | * | 6/2004 | McBrearty et al. ......... | 715/853 |
| 6,757,708 B1 | * | 6/2004 | Craig et al. ................. | 709/203 |
| 6,807,606 B1 | * | 10/2004 | Copeland et al. ........... | 711/120 |

(Continued)

FOREIGN PATENT DOCUMENTS

WO        9504960        2/1995

OTHER PUBLICATIONS

W. Berry, "Dynamic Caching", Feb. 19, 2004, downloaded from http://www.15seconds.com/issue/00907.htm, used as background material.*

(Continued)

*Primary Examiner*—William Bashore
*Assistant Examiner*—James H Blackwell
(74) *Attorney, Agent, or Firm*—Thelen Reid & Priest LLP

(57) ABSTRACT

A Web page cache that stores Web pages such that servers will be able to retrieve valid dynamic pages without going to a dynamic content server or origin Web server for the page every time a user requests that dynamic page. The dynamic content cache receives information that defines data upon which each dynamic page is dependent, such that when the value of any dependency data item changes, the associated dynamic page is marked as invalid or deleted. The dynamic page cache stores dependency data, receives change event information, and indicates when pages in the cache are invalidated or need to be refreshed.

33 Claims, 15 Drawing Sheets

U.S. PATENT DOCUMENTS

| | | | |
|---|---|---|---|
| 6,895,431 B1* | 5/2005 | Bero | 709/220 |
| 2002/0116448 A1* | 8/2002 | Copeland et al. | 709/203 |
| 2002/0116474 A1* | 8/2002 | Copeland et al. | 709/219 |
| 2004/0236824 A1* | 11/2004 | Millington et al. | 709/203 |
| 2005/0033926 A1* | 2/2005 | Dumont | 711/138 |

OTHER PUBLICATIONS

Heathco, "Quickserv", Apr. 9, 1999, downloaded from http://javabotique.internet.com/quickserv/.*

Amiri et al.,"DBProxy: A Dynamic data cache for Web applications", Mar. 5, 2003.*

Candan et al., "Enabling Dynamic Content Caching for Database-Driven Web Sites", May 21, 2001, ACM, pp. 532-543.*

Moon et al., "Caching Dynamic Web Content to Increase Dependability and Performance", downloaded, Feb. 19, 2004, http://dealnews.com/apachecon/apachecon.html, used as background.*

Iyengar et al., "Improving Web Server Performance by Caching Dynamic Data", Dec. 1997, USENIX.*

Zhu et al., "Class-based Cache Management for Dynamic Web Content", 2001, IEEE INFOCOM 2001.*

Lewis, "TurboSite", 1998, downloaded from http://javaboutique.com/TSU/, used as background.*

Press Release- "Persistance Software Customers Innovate with E-Commerce Caching," http://www/persistence.com/news/1999/1115cust.html (Nov. 15, 1999).

* cited by examiner

```
1  <Configuration>
2  <EventTransportList>
3    <EventTransport name="HTTP Event Transport">
4      <Library>%pps-SJEventTransport-http-%c-v%v1_%v2%v3%e</Library>
5      <Property name="port">880</Property>
6    </EventTransport>
7  </EventTransportList>
8  <WebSite>
9    <WebServer name="aspSite">
10     <HostName>http://www.MyAuction.com</HostName>
11   </WebServer>
12 </WebSite>
13 <EventTemplateList>
14   <EventTemplate>AuctionStatus(CatID)</EventTemplate>
15   <EventTemplate>AuctionStatus(ItemtID)</EventTemplate>
16   <EventTemplate>Bid(CatID)</EventTemplate>
17   <EventTemplate>Bid(ItemtID)</EventTemplate>
18   <EventTemplate>ItemChange(CatID)</EventTemplate>
19   <EventTemplate>ItemChange(ItemtID)</EventTemplate>
20 </EventTemplateList>
21 <RegularExpressionList>
22   <RegExp name="cantOpenAuction">Cannot create the auction</RegExp>
23   <RegExp name="genericError">An error has occurred</RegExp>
24 </RegularExpressionList>
25 <CacheableObjectList>
26 <CacheableObject webSite="aspSite" baseURI="/catItems.asp">
27   <DoNotCacheIf regexp="genericError" />
28   <DependencyRuleList>
29     <Dependency>AuctionStatus(CatId=Request.QueryString("CatID"))</Dependency>
30     <Dependency>Bid(CatId=Request.QueryString("CatID"))</Dependency>
31     <Dependency>ItemChange(CatID=Request.QueryString("CatID"))</Dependency>
32     <Dependency>ItemAdd(CatID=Request.QueryString("CatID"))</Dependency>
33   </DependencyRuleList>
34 </CacheableObject>
```

FIG. 7A

```
35      <CacheableObject webSite="aspSite" baseURI="/viewItem.asp">
36      <DoNotCacheIf regexp="genericError" />
37        <DependencyRuleList>
38          <Dependency>AuctionStatus(ItemID=Request.QueryString("ItemID"))</Dependency>
39          <Dependency>Bid(ItemId=Request.QueryString("ItemID"))</Dependency>
40          <Dependency>ItemChange(ItemID=Request.QueryString("ItemID"))</Dependency>
41        </DependencyRuleList>
42      </CacheableObject>
43    </CacheableObjectList>
44    <NonCacheableObjectList>
45      <NonCacheableObject webSite="aspSite" baseURI="/createItem.asp">
46        <EventRuleList>
47          <DoNotSendIf regexp="cantOpenAuction" />
48          <EventRule>AuctionStatus(CatId=Request.Form("CatID"))</EventRule>
49          <EventRule>ItemAdd(CatID=Request.QueryString("CatID"))</EventRule>
50        </EventRuleList>
51      </NonCacheableObject>
52      <NonCacheableObject webSite="aspSite" baseURI="/updateItem.asp">
53        <EventRuleList>
54          <DoNotSendIf regexp="genericError" />
55          <EventRule>ItemChange(CatId=Request.Form("CatID"))</EventRule>
56          <EventRule>ItemChange(ItemID=Request.QueryString("ItemID"))</EventRule>
57        </EventRuleList>
58      </NonCacheableObject>
59      <NonCacheableObject webSite="aspSite" baseURI="/placeBid.asp">
60        <EventRuleList>
61          <DoNotSendIf regexp="genericError" />
62          <EventRule>Bid(CatID=Request.QueryString("CatID"))</EventRule>
63          <EventRule>Bid(ItemID=Request.QueryString("ItemID"))</EventRule>
64        </EventRuleList>
65      </NonCacheableObject>
66    </NonCacheableObjectList>
67  </Configuration>
```

FIG. 7B

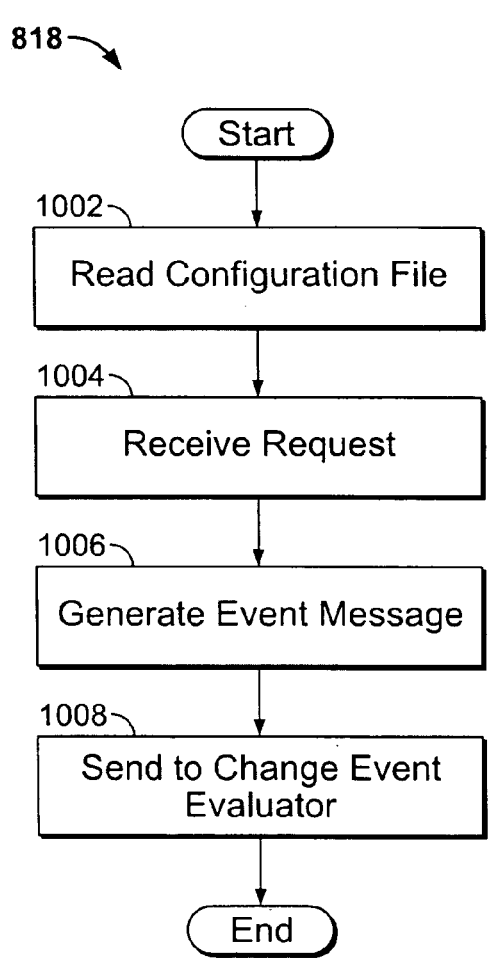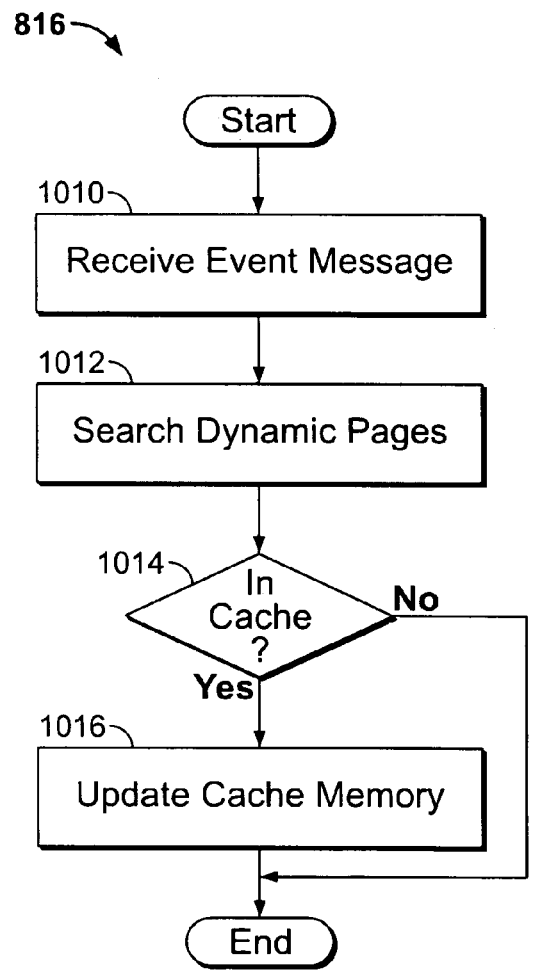
FIG. 10A
FIG. 10B

DYNAMIC WEB PAGE CACHE

This application claims priority to co-pending U.S. provisional patent application with Ser. No. 60/179811, entitled "Dynamic Web Page Cache", filed Feb. 2, 2000, and U.S. provisional patent application identified with Ser. No. 60/201,166, entitled "Dynamic Web Page Cache", filed May 2, 2000, both by the same inventors as the present application. The disclosures of said provisional applications are hereby incorporated by reference.

BACKGROUND OF THE INVENTION

1. Field of the Invention

This invention relates generally to computer network communications and, more particularly, to cache techniques for network documents.

2. Description of the Related Art

When a computer network user begins a communication session over the Internet, the user can request data files from an Internet-connected computer called an origin server using the hypertext transfer protocol (HTTP). An origin server is typically a web server on which a given resource resides or is to be generated. These data files are typically written or defined in a type of programming code or mark-up language called hypertext mark-up language (HTML), and can be viewed or displayed through a graphical user interface (GUI) program, such as "Netscape Communicator" from Netscape Communications Corporation or "Internet Explorer" from Microsoft Corporation. Such data files may specify a mixture of content including: text, graphics (image), audio, and video. The network nodes and collection of HTML are commonly referred to as the "World Wide Web" ("WWW"), and the GUI program to view the files is called a ("web browser"). A collection of related data files under a common Internet network domain name is commonly referred to as a Web site.

A network user can request a Web page (or page) on a Web site by clicking on a link on a Web page in the browser window or by typing in a uniform resource locator (URL) address in the browser location toolbar. When a Web page from a Web site is requested, the browser takes charge of displaying the returned collection of data files as a complete Web page. For example, if a Web page includes text, animated images, and audio, the web browser will retrieve the Web page and display the text, show the images, and play the audio sounds. The browser request is sent from the user computer to a series of switches and routers toward the appropriate origin web server, where the requested Web page is identified and/or generated, and returned to the user for display.

Because of extremely heavy data traffic over the Internet, cache techniques are being used to improve the speed of returning requested Web pages to network users. One way is by having a proxy server. A proxy server is a device that has a data store, cache, or cache memory that typically contains local copies of frequently requested Web pages. Proxy servers are distributed around the Internet so as to be readily accessible by various servers. Thus, if a user requests a Web page, for example, the proxy server checks the local data store to determine if it has the corresponding page in cache for the URL request just received. If the proxy server identifies that it has the Web page for the URL requested, it will return the cached Web page, found in the local proxy server, to the requesting user, rather than relaying the request all the way back to the origin server. This reduces the time for the Web pages to be returned to the user.

Often, Web pages are dynamically generated at the time they are requested to allow for content flexibility. (Dynamically created pages are hereafter referred to as dynamic pages or dynamic Web pages.) In conjunction with a web server, a script or program usually generates such dynamic pages. Typically, query parameters are also passed to the page-generating script, so that the data drawn from the data source is limited based on, for example, user's input or selection. (The process of generating Web pages is herein referred to as page generation.) One skilled in the art will recognize that Web pages may be generated via other programmed means, for example, generating Web pages using a high-level programming language, such as C++, without utilizing a web server. (Static pages are those pages that are not dynamically generated.)

Conventionally, a dynamic page is generated in response to a user request. Thus, if ten users request a dynamic page containing identical information, the origin server has to generate such page ten times to satisfy those ten requests even if no piece of information changed from the first request to the tenth request. For example, although a Web page containing a list of bids for an auction item does not change very often (probably, once every few hours during the initial posting of the item), it is likely implemented as a dynamic page and generated anew upon each user request. This unnecessary generation of Web pages, thus, adds a substantial load on the origin server's resources. Hence, a way to generate pages only when the Web page content is no longer valid and a way to alleviate the resource requirements on the origin server are highly desired.

Dynamic pages are typically not cached. Dynamic Web pages typically change frequently, often minute by minute. For example, dynamic Web pages may be used to communicate the latest bid information at an Internet auction site, or flight arrival information at a travel site, or may be used to post remaining inventory at a retail-shopping site. Because dynamic pages are not cached, all user requests for dynamic pages must travel all the way back to the origin server at the source Web site and, in addition, are generated by the origin server. This places a high demand on the origin servers for handling traffic and for generating dynamic Web pages, and can slow down the response time for web requests.

One way of caching dynamic pages is by having such pages be refreshed (i.e., replaced with a fresher or newer page) every few minutes, e.g., all cached dynamic pages that are fifteen minutes old or older are refreshed. This method, however, means that dynamic pages that are still valid (i.e., contain up-to-date information) are unnecessarily refreshed thereby needlessly taxing the resources of the system. Furthermore, users may also receive invalid web pages during the time frame when such pages have not been refreshed and contain invalid data.

Another way of caching dynamic pages enables developers to split up a dynamic page to different portions based on whether it contains static information, such as information that does not need to change, or whether it contains dynamic content, such as information drawn from a database. The system then composes a complete web page whenever a request is received. This method, however, involves redundant requests for dynamic contents considering that dynamic contents from previous requests may still be valid, as well as unnecessary delay considering that the request for dynamic content has to be sent all the way back to the origin server.

If dynamic pages were cached using conventional technology, the pages kept in cache could quickly become out of date, being superceded by more recent information from the origin server. Alternatively, if cached dynamic pages were refreshed with sufficient frequency to ensure they remain valid, the rate of refresh would likely be such that much of the cache operation would be devoted to handling refresh operations. This would tax the resources of the cache and reduce the effectiveness of the cache storage.

FIG. 1 shows a conventional arrangement 100 for providing dynamic pages to Internet users. A user at a computer with a browser 102 communicates with the Internet 104 using a network connection 105. The browser sends over the Internet Web page requests that are received by an origin server 106. Requests for dynamic pages are relayed to an origin dynamic content server 108, which generates the Web pages from a data store 110. The requested dynamic pages are then sent back to the users and displayed in the users' browsers 102.

From the discussion above, it is apparent that there is a need for an Internet cache technique that can store dynamic pages thereby reducing the workload on web servers, but efficiently maintaining valid pages without unduly taxing cache resources. The present invention fulfills this need.

SUMMARY OF THE INVENTION

The present invention provides a cache in which data files, such as Web pages, are temporarily stored such that users are able to retrieve valid data files, without requesting such data files from a dynamic content server or origin server. The dynamic content cache receives information that defines data upon which each Web page is dependent. That is, when the value of any dependency data item changes, the associated page content also changes, thus, invalidating the associated page stored in cache. An event is defined to be a change in a page dependency value or attribute that results in a change in page content. The dynamic content cache stores dependency data, receives change event information, and invalidates or refreshes pages in the cache. In this way, the invention provides a cache that can store dynamic Web pages and efficiently refresh them to timely respond to requests for page content, and thereby reduce the workload on Internet origin servers.

The present invention also provides for a computer software product and a proxy server system, which provide the functions and features described above.

Other features and advantages of the present invention should be apparent from the following description of the preferred embodiment, which illustrates, by way of example, the principles of the invention.

BRIEF DESCRIPTION OF THE DRAWINGS

FIGS. 7A and 7B contain an exemplary configuration file illustrating features of the present invention.

FIGS. 10A and 10B are block diagrams illustrating the Request-Based event generator and change event evaluator, respectively, in accordance with the present invention.

DESCRIPTION OF THE PREFERRED EMBODIMENT

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

Figure 1:
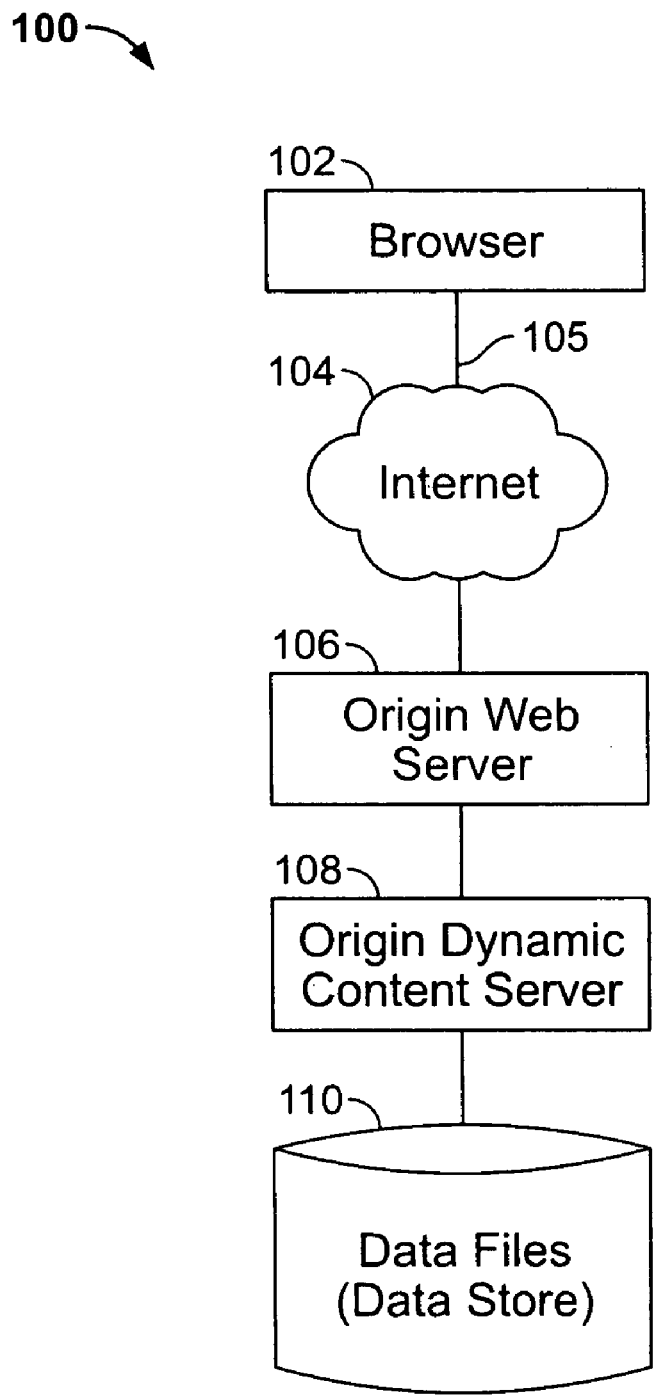
FIG. 1 is a block diagram representation of a conventional Internet arrangement that supplies dynamic Web pages to Internet users.
Figure 2A:
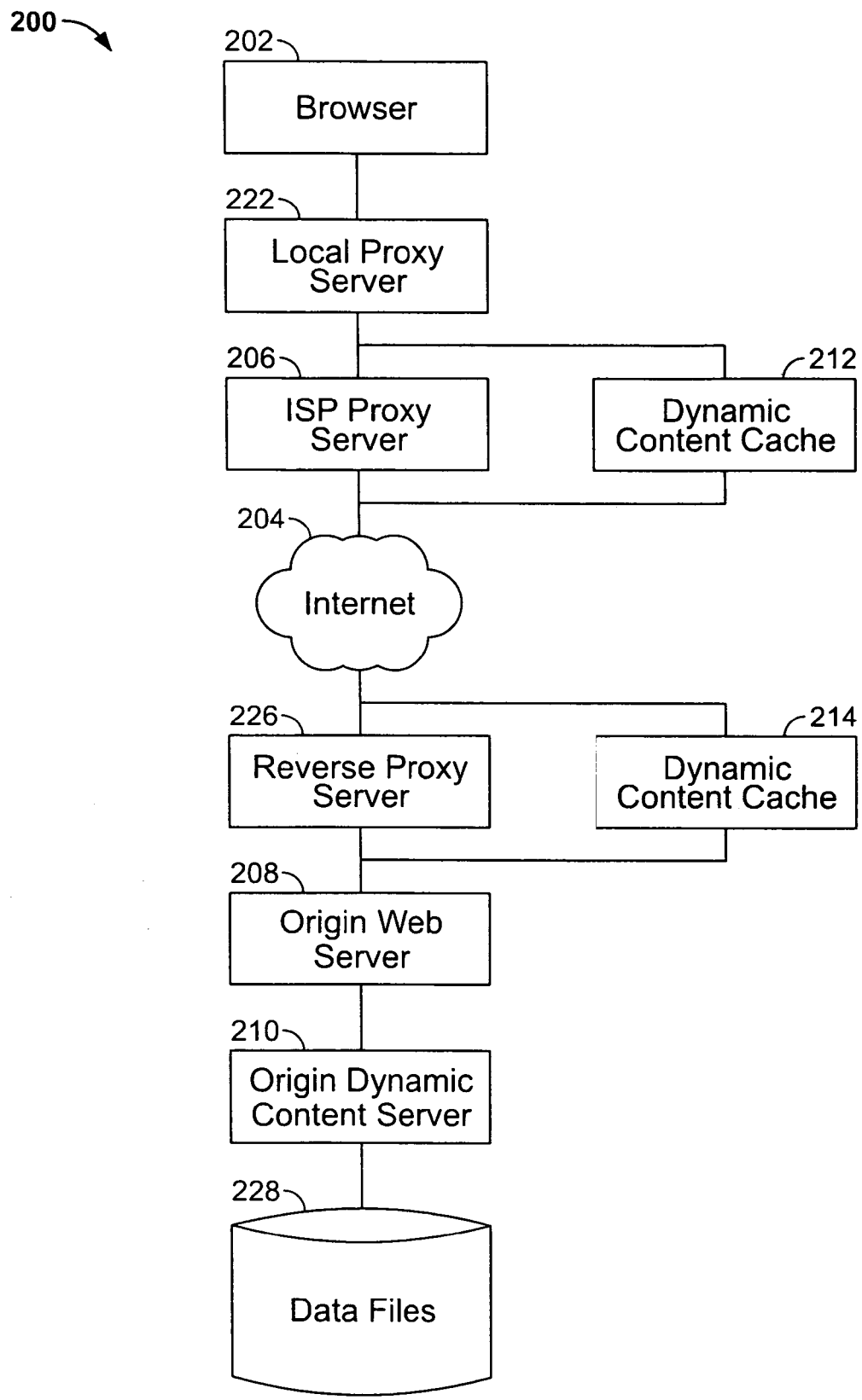
FIGS. 2A and 2B are block diagram representations of a system constructed in accordance with the present invention, showing possible locations of the novel dynamic content cache.

FIG. 2A is a representation of a system 200 that provides cached dynamic pages in response to a request from a network user in accordance with the present invention. A network user at a computer or any Internet-enabled appliance having a browser program 202, communicates with the Internet 204 through a series of network connections including an Internet Service Provider (ISP) Proxy server 206. (A proxy server is a device or software whose function includes serving Web pages from the fastest or nearest accessible source. They cache static pages and may be configured to communicate with other proxy servers that contain cached static pages.) The browser 202 sends page requests through the ISP Proxy server 206 to retrieve dynamic pages and static pages from an origin web server 208 and an origin dynamic content server 210, respectively. (A dynamic content server is a device or software whose function includes serving dynamic Web pages and/or static Web pages. It is capable of retrieving data from a data store, such as a relational database management system, and is also capable of using the data retrieved from the data store to generate a Web page incorporating the data retrieved from such data store.) In accordance with the invention, requests from the browser 202 for dynamic pages are provided by a dynamic content cache 212 that is coupled with the ISP Proxy Server 206 or by a dynamic content cache 214 that is coupled with the reverse proxy server 226. Static pages are in turn provided by the ISP proxy server 206 or by the Reverse Proxy Server 226. (Reverse proxy server is a proxy server that is near the origin web server).

The dynamic content cache 212, 214 maintains dependencies or page dependencies for the cached dynamic pages, and thereby determines when cached dynamic pages are invalid. Page dependency data or page dependencies indicate the underlying data source, such as the table, row, or field, from which the dynamic content of the page was obtained or derived. Any change in the underlying data source invalidates the pages because the dynamic contents of such pages are no longer accurate. These invalid dynamic pages are subsequently refreshed with valid dynamic pages from the origin dynamic content server 210 such that browser requests for dynamic Web pages are responded to with valid dynamic pages. The invalid dynamic pages are refreshed either when a possible change to the underlying dynamic data occurs or upon demand, when there is a user request to the dynamic content cache 212, 214 for a dynamic page that is either no longer in data store or is invalid. This relieves the demand on the origin web server 208 and the dynamic content server 210 to generate a dynamic page every time a user request for that dynamic page is received and permits faster responses to browser requests. That is, the dynamic content cache generates a dynamic page only when a page dependency changes, rather than every time a dynamic page request is received.

Figure 2B:
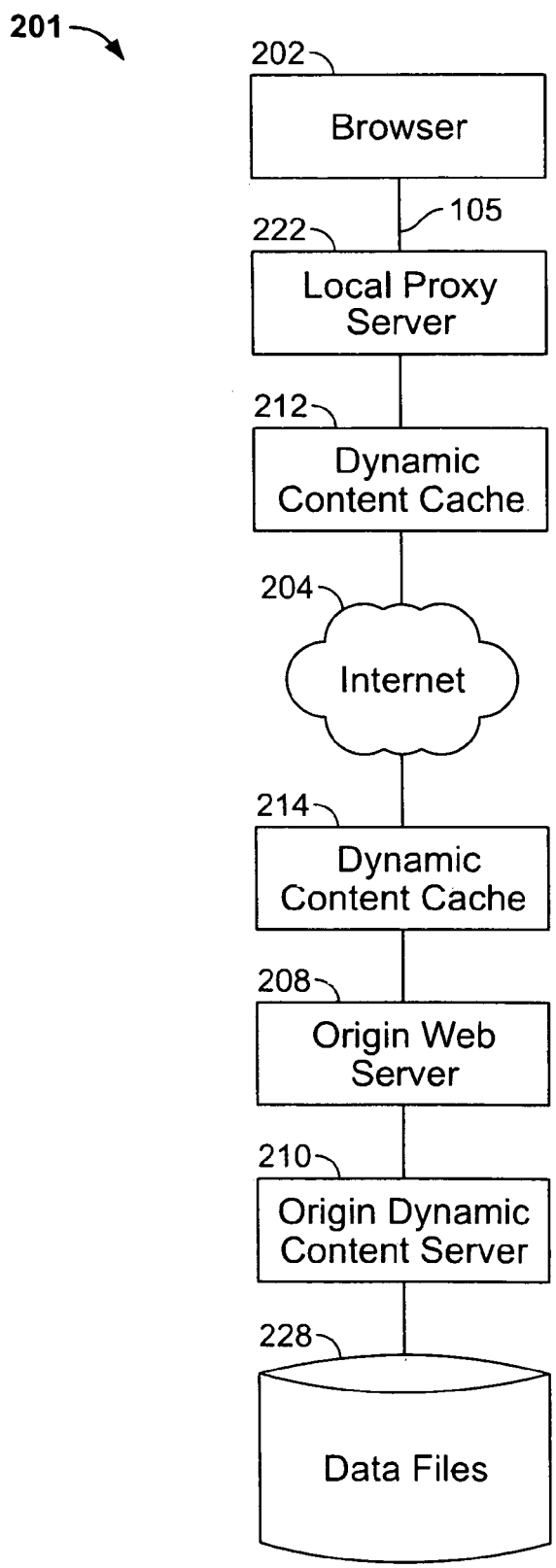

FIG. 2B is a representation of a system 201 similar to system 200 of FIG. 2A. However, in this embodiment of the invention, the dynamic content cache 212, 214 contains both static and dynamic Web pages. The functions of the ISP proxy server 206 in FIG. 2A are also done by the dynamic content cache 212 in FIG. 2B. Similarly, the functions of the reverse proxy server 226 in FIG. 2A are done by the dynamic content cache 214 in FIG. 2B. Thus, in accordance with the present invention, the dynamic content cache 212, 214 serves not only dynamic pages, but also static pages. The dynamic content cache may serve static pages using the same operation, design, and logic employed by the current invention to serve dynamic pages, or, alternatively, serve static pages using the operation, design, and logic of local proxy servers known or available in the art.

Referring to both FIGS. 2A and 2B, in the preferred embodiment, the ISP configures their system so that browser requests are first routed to the dynamic content cache 212. Thus, the corresponding origin web server 208 and origin dynamic content server 210 need not be bothered with the request for dynamic pages already cached in the dynamic content cache 212. Optionally, a local proxy server 222 may be installed between the user 202 and the ISP proxy server 206 (in FIG. 2A) or between the user 202 and the dynamic content cache 212 (in FIG. 2B), so as to provide more quickly heavily requested static pages.

Referring again to FIGS. 2A and 2B, in the preferred embodiment, the dynamic content cache 214 recognizes incoming browser requests for Web pages and first attempts to satisfy such requests, rather than immediately relaying such requests to the corresponding origin web server 208. Dynamic pages that are not found in the dynamic content cache 214 are then satisfied by the origin web server 208, dynamic content server 210, and/or from data files 228 of the Web site. Those skilled in the art will recognize that an optional reverse proxy server 226 (in FIG. 2A) may be included to respond to requests for static pages. (In FIG. 2B, the functions of the optional reverse proxy server 226 found in FIG. 2A are also done by the dynamic content cache 214 in FIG. 2B). Static pages that are not found in the reverse proxy server 226 (in system 200 of FIG. 2A) or in the dynamic content cache 214 (in system 201 of FIG. 2B) are then satisfied by the origin web server 208, dynamic content server 210, and/or from data files 228 of the Web site. (Generally, the origin web server 208 receives the request and the origin dynamic content server 210 generates the dynamic content, optionally, deriving data from data files 228.) Many dynamic Web pages are derived from information stored in an associated relational data base management system (RDBMS). The data files 228 may also include database(s) from which page contents are derived.

Requests for dynamic pages may be recognized in a variety of ways. For example, dynamic pages typically have a URL format with a recognizable extension, such as "ASP" (Active Server Pages), "JSP" (Java Server Pages), "CGI" (Common Gateway Interface), "CFM" (Cold Fusion Markup Language), or the like. Such extensions, for example, indicate that the dynamic pages were generated by a certain scripting language. In accordance with the invention, a dynamic page may also be recognized by the dependencies encoded within the dynamic page. Dynamic pages may also be recognized via a configuration file. The configuration file contains templates, patterns, syntax, and rules indicating URL requests that generate dynamic pages, as well as the URLs that are to be cached. Alternatively, request header information received by a dynamic content cache, such as headers containing form data or cookies, may contain the requisite information to enable a dynamic content cache to identify a request for a dynamic page. (A cookie is a block of data that a web server stores on a client system for later retrieval.)

Parameters being passed to the origin server may be determined by parsing the URL address and/or the request header information. A URL is the address of a resource on the Internet, with a syntax generally in the form "protocol://host/localinfo?query," where protocol specifies the means of fetching the object (such as HTTP or FTP), host specifies the remote location where the object resides, localinfo is a string (often a file name) which indicates the local path, filename, or uniform resource identifier (URI), and query specifies a parameter list. For example, the URL request, "http://www.MyAuction.com/createItem.asp?Seller=193682," indicates that "http" is the protocol used, the origin server or host Web site is "www. MyAuction.com," the URI or local file is "createItem.asp," and the parameter passed is "Seller" with a value of "193682."

One skilled in the art will easily recognize that URL requests or request header information may be parsed, searched, and read to obtain parameter information being passed to the origin web server. For example, parameters may be obtained from cookies as well as from data information contained in header information. In some cases, the parameters passed are based on the URI or local information, such as the position within the URL address (herein called positional parameters). For example, if the URL request is "http://www.myAuction.com/aw/listings/list/all/category513/index.html," the parameter, "513," is obtained from "category513." A template, syntax, or pattern match of the URL address may be written to enable the dynamic content cache to extract only certain portions of the URL address.

Figure 3:
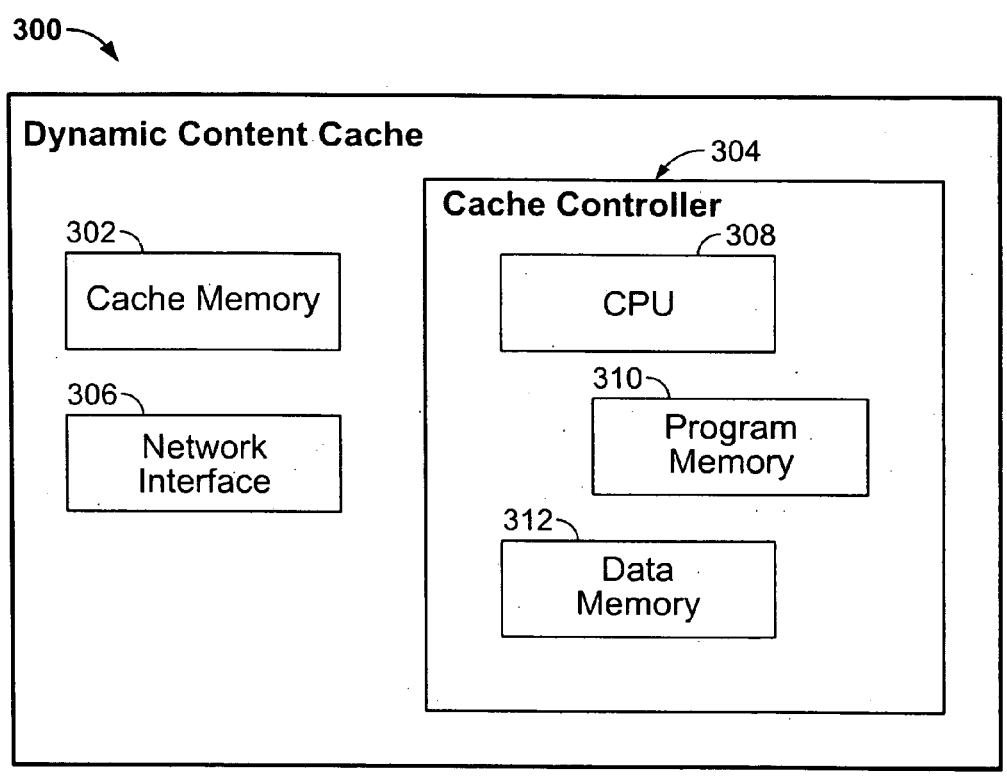
FIG. 3 is block diagram that shows the elements of the dynamic content cache illustrated in FIGS. 2A and 2B.

FIG. 3 is a block diagram 300 that illustrates the primary components within the dynamic content cache 212, 214 shown in FIGS. 2A and 2B. Each dynamic content cache includes relatively high speed cache memory 302 that is controlled by a cache controller 304 which communicates with its associated web server through a network interface 306. The cache controller 304 includes a central processor unit (CPU) 308 that executes program instructions for functional operation that are stored in program memory 310, and also includes working data memory 312.

Figure 4:
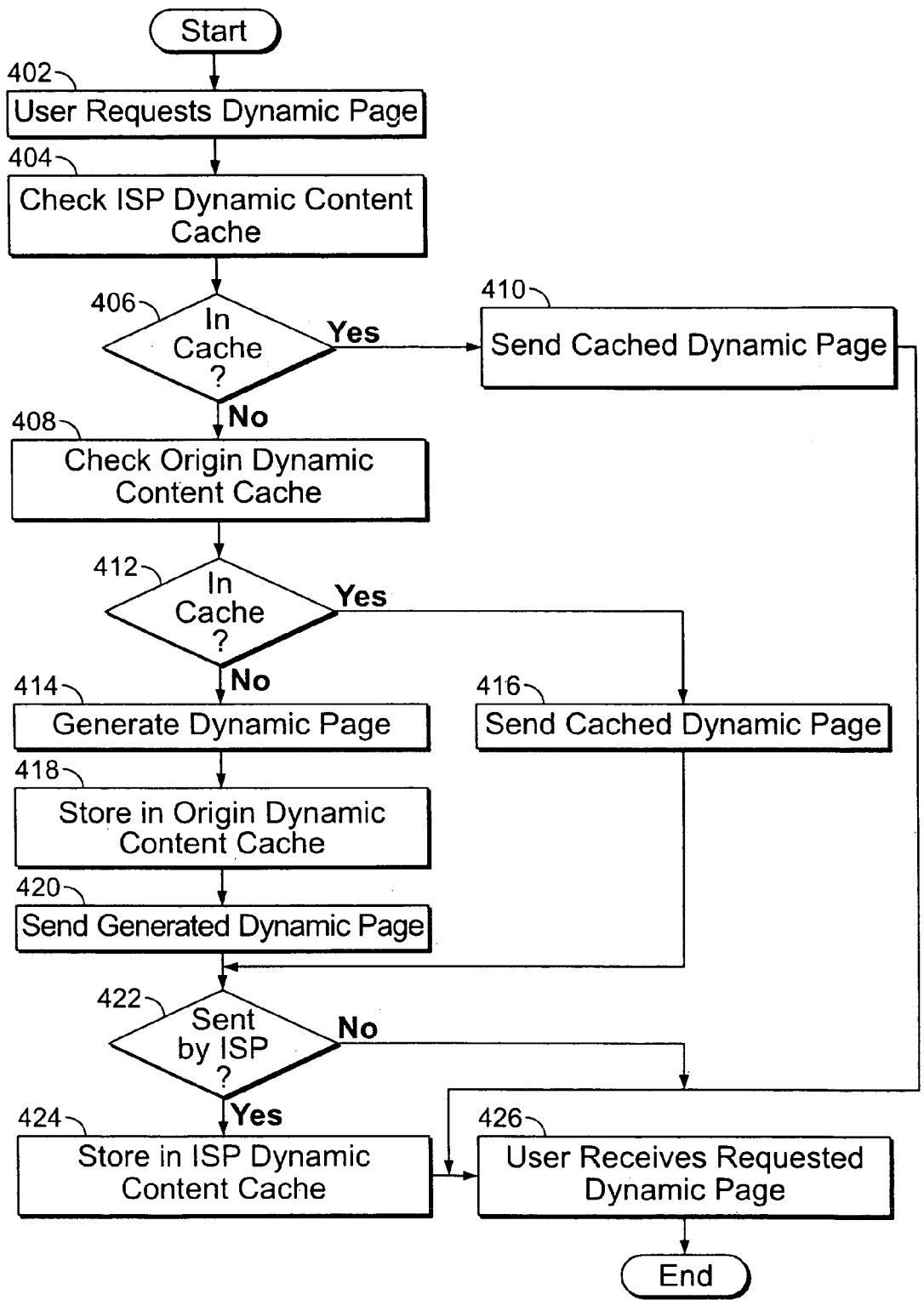
FIG. 4 is a flow diagram that illustrates the operation of the systems in FIGS. 2A and 2B to satisfy a browser request for dynamic pages.

FIG. 4 shows the basic steps performed by the systems 200 and 201 (FIGS. 2A and 2B) in accordance with the present invention to respond to a request for a dynamic page. In step 402, a user starts by requesting a dynamic page using the user's browser 202. Assuming that an ISP dynamic cache 212 is present in the system, the ISP dynamic content cache first checks its local cache to determine if the requested dynamic page is available, in step 404. If it is available, a "yes" outcome at the decision box 406, it is then sent to the user in step 410 and then eventually received by the user via the user's browser in step 426.

If the requested dynamic page, however, is not found in the ISP dynamic content cache, a "no" outcome at the decision box 406, the user request is then delegated to the origin dynamic content cache. The origin dynamic content cache in turn searches its local cache for the requested page, in step 408. If the requested dynamic page is available, a "yes" outcome at the decision box 412, the requested cached dynamic page is then returned to the requesting entity in step 416, which may be the ISP or the user depending on the system or network.

If the requested dynamic page is not available in either the ISP dynamic content cache (box 212 in FIGS. 2A and 2B) or the origin dynamic content cache (box 214 in FIGS. 2A and 2B), the requested dynamic page is generated in step 414 (usually by a script, a web server software, and a data source) by the origin web server 208, the origin dynamic content server 210, and/or, optionally, deriving data from the data files 228. Once the requested dynamic page is generated, it is then received and stored in the origin dynamic content cache 214, in step 418, so as to be made available for future requesters. The generated dynamic page is then returned to the requesting entity in step 420. If the request was received from the ISP, a "yes" outcome at the decision box 422, the ISP dynamic content cache 212 receives the requested dynamic page and then stores the requested dynamic page into its own cache in step 424. The requested dynamic page is also sent to the user and is eventually received by the user, via the browser in step 426.

If the request, however, was received directly by the origin web server from the user, a "no" outcome at the decision box 422, the requested dynamic page is generally sent directly back to the user, in step 426. One skilled in the art will recognize that, similar to proxy servers widely known in the art, variations on the system 200 and 201, such as which dynamic content cache in the system is searched, depends on how the system is implemented and where dynamic content caches are placed. Furthermore, one skilled in the art will recognize that more than one dynamic content cache may be implemented in a system. A request by one dynamic content cache, for example, may be satisfied by another dynamic content cache without going to the origin Web site, depending on the system and network architecture.

Figure 5A:
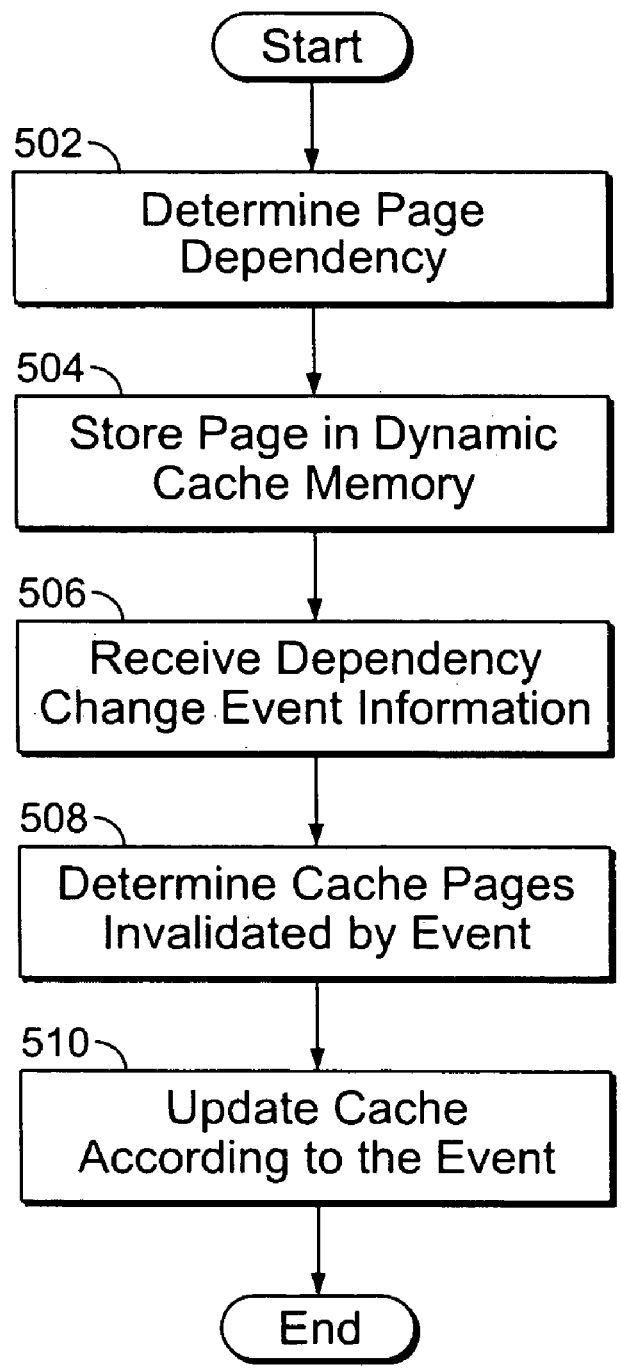
FIGS. 5A and 5B are high-level flow diagrams that show the processing performed by the FIGS. 2A and 2B system to provide dynamic cache operation in response to user browser requests as well as events.

FIG. 5A is a flow diagram that illustrates the basic operation of a dynamic content cache 212, 214 to provide cached dynamic pages. In the first operating step, represented by the box numbered 502, page dependencies are determined. Page dependencies indicate the underlying data used in generating the dynamic page. A change in the underlying data invalidates the dynamic page. For example, a Web page that contains or displays a list of items under one category currently being auctioned is dependent on items under such category. Subsequent addition or deletion of auction items within that category affects the content of such Web page. Determining page dependencies may involve, for example, mapping a dynamic page to tables, rows, or fields of a RDBMS from which the dynamic page is generated. The decision regarding page dependencies is a function of Web page design and database planning.

In the preferred embodiment of the present invention, dependencies are written using the Extensible Markup Language (XML) specification. Similar to HTML, XML is a generalized markup language. Pieces of information are delimited by start tags, e.g., "<Dependency>," and end tags, e.g., "</Dependency>," with the end tag exactly like the start tag except a slash ("/") precedes the tag name. Data delimited by a start tag and an end tag are generally called elements. Thus, "<Dependency>ItemChange(CatID=513)</Dependency>" defines an element having a content or value of "ItemChange (CatID=513)."

Once the dependencies are determined in step 502, the dynamic page, including its page dependencies, is stored in the cache memory of the dynamic content cache, in step 504. The system then automatically receives dependency change event information, typically as an event message, in step 506. Events may be received by the dynamic content cache from a variety of sources, further illustrated in FIG. 7 below. For example, a change in an associated RDBMS table will be communicated from the RDBMS to the cache controller 304. Events are also preferred to be written in the XML specification. (An event herein refers to any occurrence or transaction that invalidates a dynamic page. It is preferred that an event is represented as an XML-written event (further discussed below).)

In the next operation, based on the event message (or dependency change event information), cached dynamic pages whose dependencies are no longer valid (i.e., information is inaccurate) are invalidated in step 508. The dynamic content cache is then updated, in step 510, for example, by deleting invalid cached dynamic pages, requesting updated web pages, updating indices to cached pages, and the like. The update or portions of the update, in step 510, may occur immediately upon receipt of the event message or may be delayed until another user (or another dynamic content cache) sends another request for such Web page.

Figure 5B:
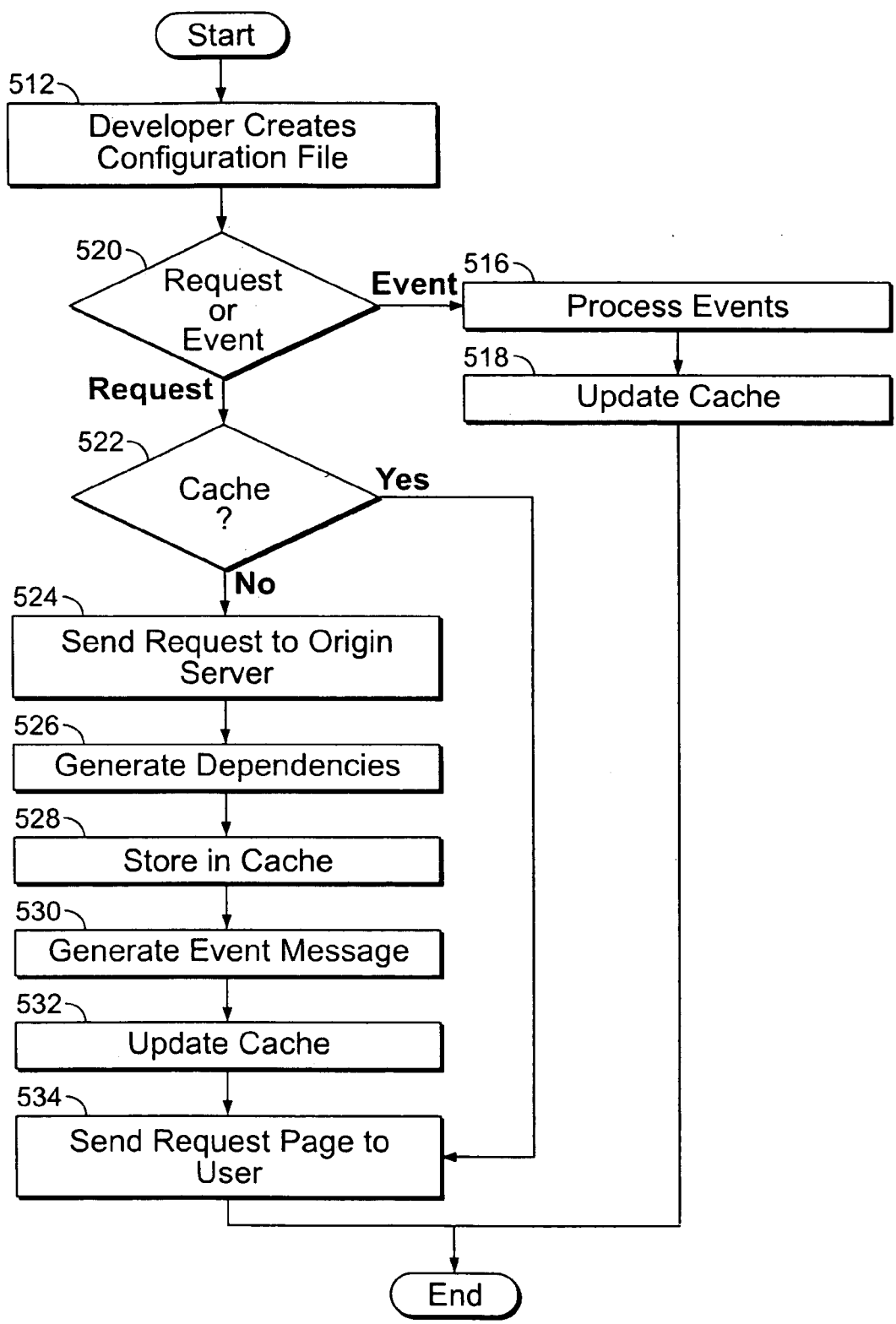

FIG. 5B is a flow diagram that illustrates the basic operation of a dynamic content cache 212, 214 to provide cached dynamic pages, taking into account whether a request or an event is received by the dynamic content cache.

In the first step, the developer creates a configuration file (further discussed in detail below) in step 512. If events are received by the dynamic content cache, the "Event" outcome at decision box 520, the dynamic content cache processes the events, in step 516, and updates the cache based on the events received in step 518, using the change event evaluator (816 in FIG. 8). If a URL request, the "Request" outcome at decision box 520, however, is received by the dynamic content cache, the dynamic content cache checks if the Web page requested is in cache. If the requested page is in cache, a "yes" outcome at the decision box 522, a copy of the requested cached dynamic page is sent to the user at step 534. If the dynamic page requested, however, is not found, a "no" outcome at the decision box 522, the URL request is sent to the origin server at step 524. Once the requested page is received from the origin server, based on the configuration file, dependencies may be generated for the requested page in step 526. The requested page is then stored in cache, including any dependencies generated in step 528. Change events then may also be generated in step 530 and if necessary, the cache is updated in step 532.

To explain the features of the present invention, an example auction Web site, MyAuction.com, is exemplified. MyAuction is an auction Web site that enables persons, called bidders, to bid on items being auctioned by sellers. Each item belongs to exactly one category, for example, the "Card A Set" item may only belong to one category, "Playing Cards." A quantity of one is assumed for each item being auctioned.

MyAuction.com Web site obtains its information from four tables: an Item table, a Category table, a Bid table, and a Bidder table. The Item table contains items that are being or have been auctioned. An auction for an item is open or begins from the time the seller creates the item's entry (i.e., status is "open") until the auction closes (i.e., the status is "closed"). A seller provides the following field information for that specific auction or item: Title (description of the item), OfferAt (the initial or starting price), Closes (date and time when auction closes), and the CatID (category of the item). The system automatically generates the "ID," (the unique ID number for that auction item), the "Status," ("open") and the "SellerID" (unique ID number for such seller) at time of creation. An auction is initially set to "open" but is automatically changed to a "closed" status when the date and time when the auction period ends have been reached. In this example, the seller may only change the information contained in the "Title" field once an item is created.

Table I below contains sample records of an Item table.

TABLE I

Item Table

| Ln | ItemID | CatID | Title | OfferAt | Closes | Status | Seller |
|---|---|---|---|---|---|---|---|
| 1 | 5112 | 211 | Video Recorder | 650.00 | 02/24/2000 05:35 pm | closed | 817923 |
| 2 | 5390 | 131 | Card A Set | 11.99 | 02/25/2000 11:59 pm | open | 595617 |
| 3 | 5853 | 131 | Card B Set | 1.49 | 02/26/2000 10:00 am | open | 473124 |
| 4 | 5945 | 131 | Card C Set | 1.49 | 02/26/2000 11:59 am | open | 327051 |
| 5 | 6021 | 301 | 2 nights, Ohio | 125.00 | 02/24/2000 10:00 pm | closed | 193682 |
| 6 | 6113 | 131 | Card D set | 11.49 | 02/26/2000 04:59 pm | open | 273051 |

Table II below shows an example Category table containing some records. The CatID field of Table I is linked to the CatID of Table II.

TABLE II

Category Table

| Ln | CatID | Category_Description |
|---|---|---|
| 1 | 101 | Toys & Games |
| 2 | 131 | Playing Cards |
| 3 | 211 | Sony Digital Cameras |
| 4 | 301 | Vacation Travel |

Table III, below, shows an example Bid table containing some records.

TABLE III

Bid Table

| Ln | ItemID | BidderID | OfferPrice | BidPlaced |
|---|---|---|---|---|
| 1 | 5390 | 476142 | 12.99 | 02/24/2000 06:43pm |
| 2 | 5945 | 193682 | 16.99 | 02/23/2000 07:00am |
| 3 | 6113 | 193682 | 16.99 | 02/20/2000 08:45pm |
| 4 | 6113 | 284501 | 17.99 | 02/22/2000 09:41am |
| 5 | 6113 | 476142 | 20.99 | 02/24/2000 05:30pm |
| 6 | 5853 | 597315 | 17.99 | 02/21/2000 11:59pm |
| 7 | 5945 | 476142 | 29.00 | 02/23/2000 07:09am |

The Bid table contains records of bids. Each bid record identifies the item (i.e., the ItemID that is linked to the Item Table in Table I), the bidder (BidderID), the offer or bid price (OfferPrice), and when the bid was placed (BidPlaced). The winning bid is the bid with the highest bid price, or "OfferPrice" for a particular item. Once a customer places an initial bid, only updates and increases to the bid price (OfferPrice) are allowed.

Table IV below is a sample Bidder table, which is linked to the BidderID field in Table III.

TABLE IV

Example Bidder Table

| Ln | BidderID | Name |
|---|---|---|
| 1 | 193682 | RJ of San Mateo, CA |
| 2 | 284501 | NZ of Columbia, MO |
| 3 | 476142 | LM of Albany, NY |
| 4 | 595617 | KB of Fort Worth, TX |
| 5 | 597315 | CF of Ft. Myers, FL |

To determine whether a Web page is a good candidate for caching, a developer first determines whether the number of times a dynamic Web page is viewed is more than the number of times changes in the underlying table or tables occur. Once a determination is made that a Web page is a good candidate (because it is viewed more often than it is modified), an analysis has to be made on what changes affect the underlying data.

Figure 6A:
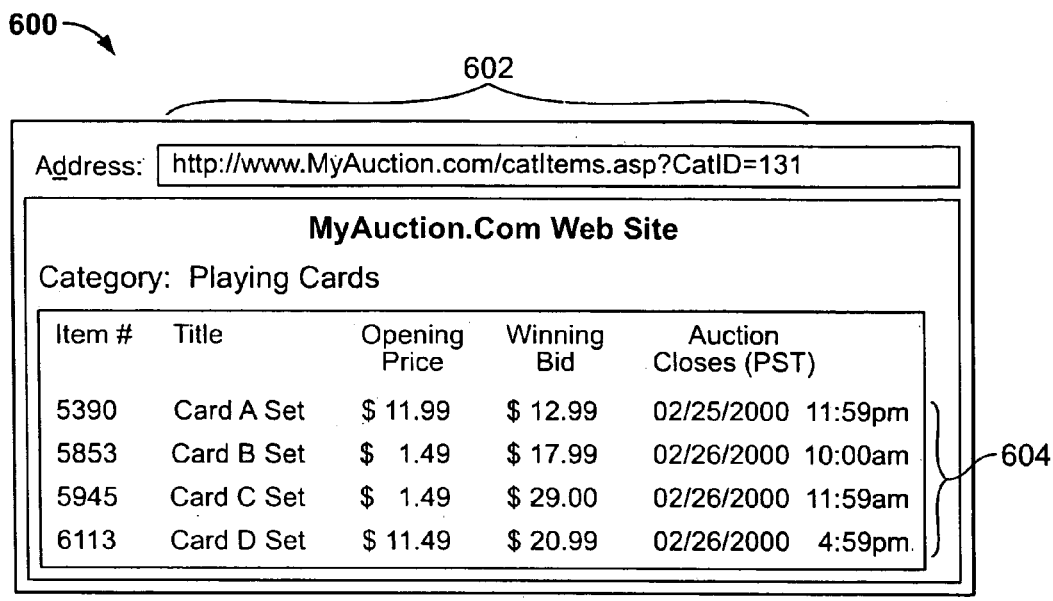
FIGS. 6A, 6B, 6C are sample dynamic pages.

Using information contained in Tables I, II, and III, FIG. 6A shows a sample dynamic Web page, 600, displayed on the user's browser based on user's request 602, "http://www.MyAuction.com/catItems.asp?CatID=131." The dynamic page 600 lists all open auction items currently available under the selected category, "Playing Cards" (CatID is "131," line 2 of Table II). The data or contents of the Web page are obtained from Table I lines 2, 3, 4, and 6; Table III lines 1, 5, 6, and 7; and Table II line 2. Based on the underlying data, several events invalidate the cached dynamic page 600; for example, an entry of another auction item under the "Playing Cards" category; another bid for any item under that same category (because winning bid column becomes inaccurate), an expiration or closing of any auction period under that same category, or any change on the Title (or description) of items under that same category.

Figure 6B:
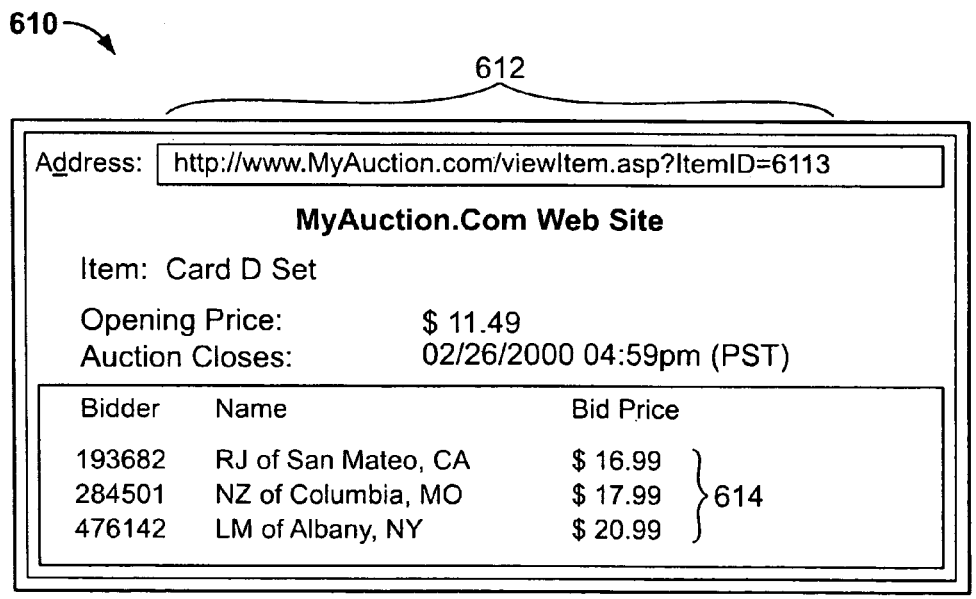

FIG. 6B shows another sample dynamic page, 610, based on user's URL request 612, "http://www.myAuction.com/viewItem.asp?ItemID=6113." The dynamic page 610 list all bidders of the "Card D Set" item (Table I line 6; Table II line 2; Table III lines 3 to 5; Table IV lines 1 to 3). This page becomes invalid if a new bid is entered for the "Card D Set" or if the title of the item, "Card D Set," (ItemID is "6113") is changed by the seller.

Figure 6C:
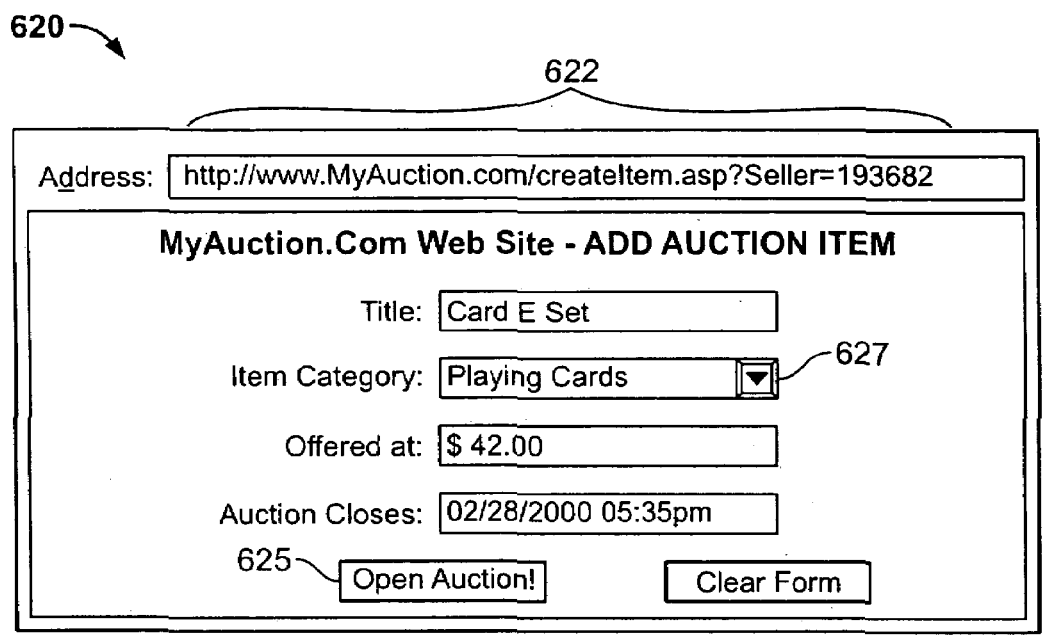

FIG. 6C shows another sample dynamic page 620 based on user's URL request 622, "http://www.MyAuction.com/createItem.asp?Seller=193682," which creates an auction item (i.e., a record into Table I). Because the dynamic page 620 is based on user's input and is only applicable to that transaction, this dynamic page is not a good candidate for caching, and is preferred to be indicated as non-cacheable.

To determine dependencies, for example, for FIGS. 6A, 6B, and 6C, a developer has to understand what underlying fields or data sources are used in the dynamic page, and based on those fields or data sources recognize what events invalidate the page. In the preferred embodiment, dependencies are specified with a start tag and closing tag, to be in the form "<Dependency>event-name (parameter_name=parameter_value, . . . )</Dependency>." A dynamic page may contain a dependency data containing more than one dependency. The event-name may be any user-defined event name; however, event names defined in the dependencies must correspond or relate to those defined in the events (further discussed below).

Table V lists the dependency data that may be associated with the dynamic Web page 600.

TABLE V

Associated Dependencies for Dynamic Web Page 600 in FIG. 6A

| Ln | Dependency Data |
|---|---|
| 1 | <Dependency>AuctionStatus(CatID=131) </Dependency> |
| 2 | <Dependency>Bid(CatID=131)</Dependency> |
| 3 | <Dependency>ItemChange(CatID=131)</Dependency> |
| 4 | <Dependency>ItemAdd(CatID=131)</Dependency> |

In accordance with the present invention, the dynamic content cache parses URL addresses, including request header information, and obtains the parameters passed or sent to the origin server. The parameters sent dictate what underlying data are to be displayed. Referring back to FIG. 6A, the parameter CatID with value "131" (i.e., "Playing Cards"), obtained from URL request 602, is passed to the origin server; thus, only items under such category are displayed. The dynamic page 600 is dependent on the underlying data, and any change to the underlying data invalidates the dynamic page. In Table V, for example, line 1 indicates that the dynamic page 600 is dependent on having no status changed (from "open" to "closed") for any item listed under the "131" category; line 2 indicates that it is dependent on having no additional bid be placed on any item listed under the "131" category; line 3 indicates it is dependent on having no change made to the title of any item listed under "131" category; and line 4 indicates that it is dependent on having no additional item added under "131" category. Any events affecting the underlying data invalidate the page.

In the preferred embodiment, events are represented by event rules which have the following syntax: "<EventRule>event-name(parameter-value, . . . )</EventRule>. Such events are also preferred to be incorporated into an event message. Based on events, the dynamic content cache searches for files whose dependencies match the content of the events received, and accordingly delete such pages from cache or refresh the pages, and accordingly update the indices to those files. (When pages are actually deleted from cache or refreshed depends on implementation. Pages may be deleted by marking them invalid and deleting them later at a specified time or just marking them invalid. Pages may be refreshed immediately or refreshed when subsequently requested.) Thus, one event may invalidate more than one cached dynamic page.

Table VI below is a list of events if received by the dynamic content cache invalidates the dynamic page 600.

TABLE VI

Associated Event Rules Invalidating Dynamic Web Page 600 in FIG. 6

| Ln | Events Or Event Rules |
|---|---|
| 1 | <EventRule>AuctionStatus(CatID=131)</EventRule> |
| 2 | <EventRule>Bid(CatID=131)</EventRule> |
| 3 | <EventRule>ItemChange(CatID=131)</EventRule> |
| 4 | <EventRule>ItemAdd(CatID=131)</EventRule> |

Referring to Tables V and VI, the event names and parameters used in the dependencies match those event names and parameters used in the events (i.e., the contents of the Dependency elements match the contents of the EventRule elements). This enables the dynamic content cache to find the exact pages containing the now invalid dependencies on the underlying data source(s). Furthermore, the dynamic content cache only needs to receive any one of such events listed in Table VI to invalidate page 600. These events may be received from various sources, such as from the dynamic content cache itself, from a database, from a script, or from a custom software application.

In Table VI, line 1 indicates that the status of an item listed under category "131" has been changed (i.e., from "open" to "closed"); line 2 indicates that a new bid was placed on an item listed under category "131"; line 3 indicates that the title of an item listed under category "131" has been changed; and line 4 indicates that an item was added under the category "131."

Referring to FIG. 6C, the URL request 622 invalidates the dynamic page 600 contained in FIG. 6A. This is because the addition of the item "Card E Set" under the "Playing Cards" category ("131", Table II line 2) means that the list 604 in FIG. 6A is no longer valid or accurate. When a user clicks on the Open Auction button 625 in FIG. 6C, events are generated to indicate that an item was added to the category "131." One event generated is "<EventRule>ItemAdd (CatID=31)</EventRule>."

A URL request, not shown in the figures, that adds another bid to the "Card D Set" (Table I line 6) invalidates the dynamic page 610 in FIG. 6B, because the list of bidder 614 is no longer accurate or valid. Assuming the URL request for such a transaction is "http://www.MyAuction.com/placeBid.asp?ItemID=6113," two events may be generated based on such transaction or URL request. Table V below shows two events that are generated for such URL request and which are sent to the dynamic content cache. (See also FIG. 7B lines 62 and 63).

TABLE VII

| Ln | Events or Event Rules |
|---|---|
| 1 | <EventRule>Bid(CatID=131) </EventRule> |
| 2 | <EventRule>Bid(ItemID=6113)</EventRule> |

Line 1 indicates that a new bid was added for category "131" ("Playing Cards") and line 2 indicates that a new bid was added for item "6113" ("Card D Set"). How such events are generated is further discussed below.

FIGS. 7A and 7B contain a listing of a configuration file used by the dynamic content cache. It is preferred that one configuration file be created for each logical origin server or Web site; thus, there may be more than one configuration file contained in the dynamic content cache. This enables developers to independently create configuration files, as well as allow easy modifications to them. For example, one configuration file is created for the Persistence Software web site (www.persistence.com), one for the Microsoft® web site, and another one for the IBM® web site. It is also preferred that the configuration be written using XML, as illustrated in FIGS. 7A and 7B.

Referring to FIG. 7A, the EventTransportList element, lines 2 to 7, indicates to the dynamic content cache the method of delivering events to the dynamic content cache; how the dynamic content cache should receive events, the name of the dynamic library to be used to receive events, the protocol used, and the like. The WebSite element, lines 8 to 12, shows the root address (Web site or origin server) of the web pages that may be cached by the dynamic content cache. The HostName element, line 10, specifies the DNS address portion of the URL. The WebServer element, line 9, list all the HostName elements, line 10, for a particular logical origin server (in this example, the "aspSite"). A logical origin server may consist of one physical server with multiple, equivalent DNS names, or of multiple physical servers in a load-balanced cluster.

The EventTemplateList element, lines 13 to 20, shows the pattern, template, or syntax of dependency/event rules recognized by the dynamic content cache, without the actual parameter values. The EventTemplateList acts like a template or a pattern of URL requests that the dynamic content cache monitors. EventTemplate elements, lines 14 to 19, are preferred to be in the syntax of "<EventTemplate>event-name(parameter-name, . . . )<\EventTemplate>. The event-name is developer-defined. The event-name is preferred to describe the event that invalidates the underlying data in a dynamic page.

The RegularExpressionList element, lines 21 to 24, indicates to the dynamic content cache errors (contained in pages) that may be received from the origin server. In addition, in line 28, errors received in response to a request are indicated to be ignored, that is, not cached, as specified in the DoNotCacheIf element. Thus if a dynamic content cache receives a page containing "An error has occurred," such page is not cached by the dynamic content cache.

The CacheableObjectList element, FIG. 7A lines 25 to 34 and FIG. 7B lines 35 to 43, is used by the dynamic content cache, particularly by the Request-based dependency generator (further discussed below), to generate dependencies attached to a requested cached dynamic page. FIG. 7A line 26 indicates that if a dynamic page is received with a URL address starting with "http://www.MyAuction.com/catItem.asp" (see lines 9, 10, and 26 of FIG. 7A) dependency rules specified in lines 29 to 32 are attached or appended to such dynamic page. (The dynamic content cache knows that it is the "http://www.MyAuction.com" Web site by looking at lines 9 to 12 of the configuration file.) Such dependency rules may be appended at the end of the dynamic page or are stored in a format enabling the dynamic content cache to associate such dependencies to such dynamic Web page.

The "Request.QueryString" function in lines 29 to 32 is a function that parses the URL request received and returns a parameter list with values. Thus, if the URL address "http://www.MyAuction.com/catItems.asp?CatID=131" 602 of FIG. 6A is passed to the dynamic content cache, the Request.QueryString("CatID") function results in the "131" (CatID) parameter being returned to the dynamic content cache. One skilled in the art will recognize that a function may be created to parse header information, containing form data and/or cookies, as well as parsing URL request containing positional parameters. For example, if the URL request is "http://www.myAuction.com/aw/listings/list/all/category513/index.html," a function may be created to extract "513" from the URL address. This positional URL address may also have to be indicated in the configuration file to obtain the positional parameter. This may be done, for example, by adding a PositionalParameter element containing the following rule, "/aw/listings/list/all/category\[0–9]\{1,\1}\}\)/index.html." Thus, the parameter "513" is returned if the Request.QueryString function is applied. Parameters from a header request containing form data may be obtained, for example, by using a Request.Form (a variant of the Request.QueryString) function, which extracts parameter list from the form data. Additionally, a cookie file called cookie1 containing "CatID=7&ItemID=2345" parameters may be obtained by a variant Request.Cookies function. One skilled in the art will recognize that these functions can easily be created.

Lines 26 to 33 indicate to the dynamic content cache that if a URL request with a pattern starting with "http://www-.MyAuction.com/catItem.asp" (obtained from lines 9, 10, and 26) is received by the dynamic content cache, the dependency rules listed in lines 29 to 32 are to be generated and attached with the received dynamic page (if no dependency rules are already encoded in the page). Thus, Table V above lists the dependencies, indicated by lines 29 to 32, generated by the dynamic content cache and attached to the requested dynamic page 600. It, particularly, shows the dependencies attached to the request "http://www.MyAuction.com/catItems.asp?CatID=131" 602 in FIG. 6A.

FIG. 7B is the continuation of the configuration file listing contained in FIG. 7A. Lines 35 to 41 of this figure indicate to the dynamic content cache the dependencies to be generated if a URL request which starts with "http://www-.MyAuction.website/viewItem.asp" (see FIG. 7A, lines 9, 10, and FIG. 7B line 35) is received. Lines 38 to 40 particularly show the dependencies that are to be generated. Line 36 indicates to the dynamic content cache that if a page is received containing the generic error, "An error has occurred" (see FIG. 7A line 23), such dynamic page is to be ignored and not cached.

The NonCacheableObjectList element, in lines 44 to 66, indicates to the dynamic content cache that certain URL requests are to be ignored and not cached. Referring to FIG. 6C, the dynamic page 620 allows a seller to enter an item for auction. Once the seller enters the information and selects the "Open Auction!" button 625, the parameters or input information entered are either appended as part of the URL request address or are passed to the origin server as HTTP form parameters. Because such a request is unique to that transaction, caching such a dynamic page is inefficient. In addition, dynamic pages that are used to change information in an underlying data source rather than used for viewing or display, are not good candidates for caching. Thus, line 45 of FIG. 7B explicitly tells the dynamic content cache to ignore such URL request pattern (i.e., "http://www.MyAuction.com/createItem.asp"). Other URL request patterns (lines 52 and 59) are also not cached by the dynamic content cache. Thus, if the dynamic content cache receives "http://www.MyAuction.website/updateItem?ItemID=6113" (see line 52) or a URL request "http://www.MyAuction.website/placeBid.asp?CatID=131&ItemID=6113" (see line 59), such page requests are ignored and not cached in the dynamic content cache memory. One skilled in the art will recognize that various other patterns of URL request may be indicated in the configuration file.

The EventRuleList element, found in line 46, instructs the dynamic content cache that whenever it receives a URL request with pattern, "http://www.MyAuction.website/createItem.asp," the dynamic content cache is to generate change events (or events) listed in lines 48 and 49. In the preferred embodiment, these events are incorporated in an event message. An event message may contain one or more event rules, is preferably written in XML or HTML and has the format described in Table VIII below.

TABLE VIII

Event Message

Ln Event Message Syntax or Format

1 <EventMessage>
2    <EventGroup webSiteID=URL eventSource=SourceID time=date-time>
3       <EventRule>event-name(parameter-name=value, . . .)</EventRule>
4       <EventRule>event-name(parameter-name=value, . . .)</EventRule>
5    </EventGroup>
6 </EventMessage>

Referring to Table VIII, webSiteID (line 2) indicates the root URL, the eventSource indicates from where the event message originated, and time indicates when the event message was generated. The EventRule elements listed in lines 3 and 4 indicate events that would invalidate cached dynamic pages having any dependency identical or matching those events listed. (The event evaluator 1116 of FIG. 11, further discussed below, does this function.)

If the URL request "http://www.MyAuction.com/createItem.asp?Seller=193682" 622 in FIG. 6C is received by the dynamic content cache, an event message containing two events, "<EventRule>AuctionStatus(CatID=131)</EventRule>" and "<EventRule>ItemAdd(CatID=131)</EventRule>" (FIG. 7B, lines 48 and 49) are generated. This means that Web pages dependent on having no items added to their "131" category or dependent on having no status change for items in the "131" category are now invalid. Consequently, FIG. 6A is invalidated by such event. Referring to Table V, which contains the dependencies of dynamic page 600 (FIG. 6A), the events generated by URL request 622 in FIG. 6C (mentioned in this paragraph) matches the dependencies for FIG. 6A. The content of the first event, "AuctionStatus(CatID=131)" matches the dependency of the dynamic page 600, "AuctionStatus (CatID=131)" (Table V, line 1), and the second event "ItemAdd(CatID=131)" matches the dependency of page 600 (Table V, line 4).

If a URL request starting with the string "http://www.MyAuction.website/updateItem.asp" is received, such as "http://www.MyAuction.website/updateItem.asp?Item=6113" (which is a Web page that enables a seller to update the title of the auction item), using lines 55 and 56 of the configuration file, FIG. 7B, an event message illustrated in Table IX is generated.

TABLE IX

Sample Event Message

Line Event Message

1 <EventMessage>
2 <EventGroup webSiteID="http:/www.MyAuction.com"
   eventSource="dynamicproxy.MyAuction.com"
   time="2000/04/01/15:13:32:287 PST">
3       <EventRule>ItemChange(CatID=131)</EventRule>
4       <EventRule>ItemChange(ItemID=6113)</EventRule>
5    </EventGroup>
6 </EventMessage>

The events listed in lines 3 and 4 indicate that cached dynamic pages are now invalid if they are dependent on having no change made (i.e., no change to the title field) to the particular item, "6113" (Card D set) or on having no change to the title of any items in the "131" category. The event in line 3 of Table IX, "ItemChange(CatID=131)," also invalidates the dependency of dynamic page 600, because page 600 has a dependency also called "ItemChange (CatID=131)" (Table V line 3). The EventSource and Time parameters in line 1 are optional items. One skilled in the art will recognize that other information may be added to the event message.

The configuration file may also contain information on when events are not to be generated. Line 54 of FIG. 7B, "<DoNotSendIf regexp="genericError"/>, indicates that the event message listed in Table IX is not to be generated if the page requested contains the "An error has occurred" expression. The "genericError" variable contains the "An error has occurred" expression as shown in FIG. 7A line 23.

In the preferred embodiment, each event name, either for dependencies or for events, includes a criteria parameter. In addition, it is preferred that all of the cached dynamic pages, including their dependencies, be indexed not only by their dependencies but also by their URL address (either partial or complete) so that the collection of pages with a dependency that matches a given event may be quickly derived.

One skilled in the art will also recognize that the dependencies and events may be modified such that additional data are passed to the dynamic content cache. For example, events and/or dependencies may be modified to include the updated information, which particular record, field, or item was changed, the old data and the updated data, and the like. Furthermore, one skilled in the art will recognize that the dependencies and events may be denoted in many ways depending on implementation; for example, the dependency "ItemChange(CatID=131)" may be denoted as a unique identification number, "A11." Moreover, the name of the elements may be altered or replaced (e.g., "NonCacheableObject" may be changed to "EventObject") without affecting the features of the present invention.

One skilled in the art will recognize that additional information may also be added to the configuration file to give the dynamic content cache more flexibility. For example, the configuration file may contain elements that indicate to the dynamic content cache which URL pages are to be deleted from cache on a specific day, or it may also contain elements containing special file extensions indicating to the dynamic content cache all dynamic pages generated for such Web site. One skilled in the art will also recognize that changing the configuration file is simple to do (e.g., by just adding, deleting, or modifying elements on the configuration file).

Figure 8:
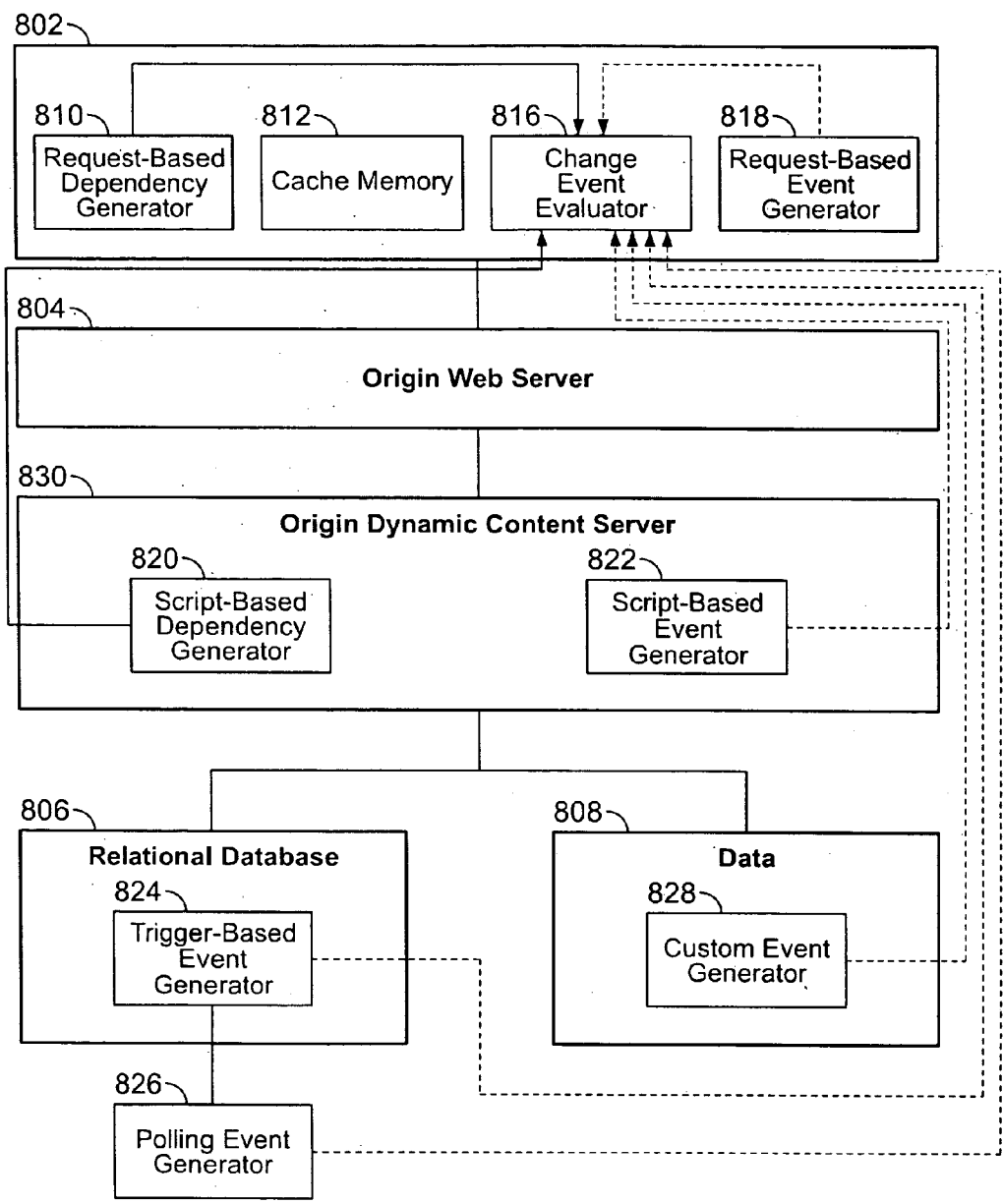
FIG. 8 is a block diagram representation of a system constructed in accordance with the present invention to track events and dynamic page updates.

FIG. 8 shows the data flow into a dynamic content cache 802 constructed in accordance with the present invention. The dynamic content cache 802 receives data files, such as Web pages, from an origin web server 804, which receives dynamic pages from an origin dynamic content server 830, which receives data from a relational database or databases 806 and/or a collection of data files or any data source 808. In FIG. 8, the solid lines indicate data flow for dependency information, and the dashed lines indicate data flow for propagation of change event information.

In the preferred embodiment, the dynamic content cache 802 includes a Request-based dependency generator 810, cache memory 812, change event evaluator 816, and Request-based event generator 818. The cache memory 812 stores the dynamic pages, indices to cached pages, indices to dependencies, configuration file, and other information necessary for operating the dynamic content cache. The cache memory also includes not only random access memory (RAM) but also more permanent physical media, such as hard disk drives. It should be understood that the remaining components 810, 816, and 818 represent the functional blocks of the cache controller described above in conjunction with FIG. 3. The architecture of the cache controller 802 supports the dynamic page cache in accordance with the invention.

The Request-Based dependency generator 810 generates dependency using the URL request. In accordance with the present invention, a configuration file is used in conjunction with the dynamic content cache to generate such dependencies. (The Request-based dependency generator is discussed in detail below).

The change event evaluator 816 receives event messages and based on such event messages, particularly, the events received, updates the cache memory by refreshing or deleting cached dynamic pages no longer valid and updating the necessary indices, if appropriate. The event evaluator is further discussed in detail below.

The Request-based event generator 818, sits in-process with the dynamic cache, and generates events based on URLs that are received and served by the dynamic cache. The events are typically contained in an event message. The Request-Based event generator 818 is further discussed below.

In the preferred embodiment, events via event messages are communicated such that they do not overly tax the computing resources of the dynamic cache controller. Therefore, they are handled such that they have very low overhead, are asynchronous, and one-way in transmission to the change event evaluator 816. The architecture of a change event evaluator 816 is such that it receives event information and provides a cache controller that does not require code generation or modification when a new event type is added to the system. This keeps the dynamic content cache system as dynamic and flexible as possible. The system also provides reliable delivery, meaning that each change event data is either delivered successfully, or the sender is notified that the transmission failed.

The preferred embodiment supports dependency generation in two ways: through a Request-Based dependency generator 810 and through a script-based dependency generator 820. Generally, the Request-based dependency generator 810 generates dependencies based on the URL requests received. URL request patterns for dependency generation are contained in the configuration file. For example, FIG. 7A lines 29 to 32 are the dependency rules to be associated to such URL requests having the pattern "http://www.MyAuction.com/catItems.asp" (see lines 9, 10, and 26 of FIG. 7A).

Figure 9:
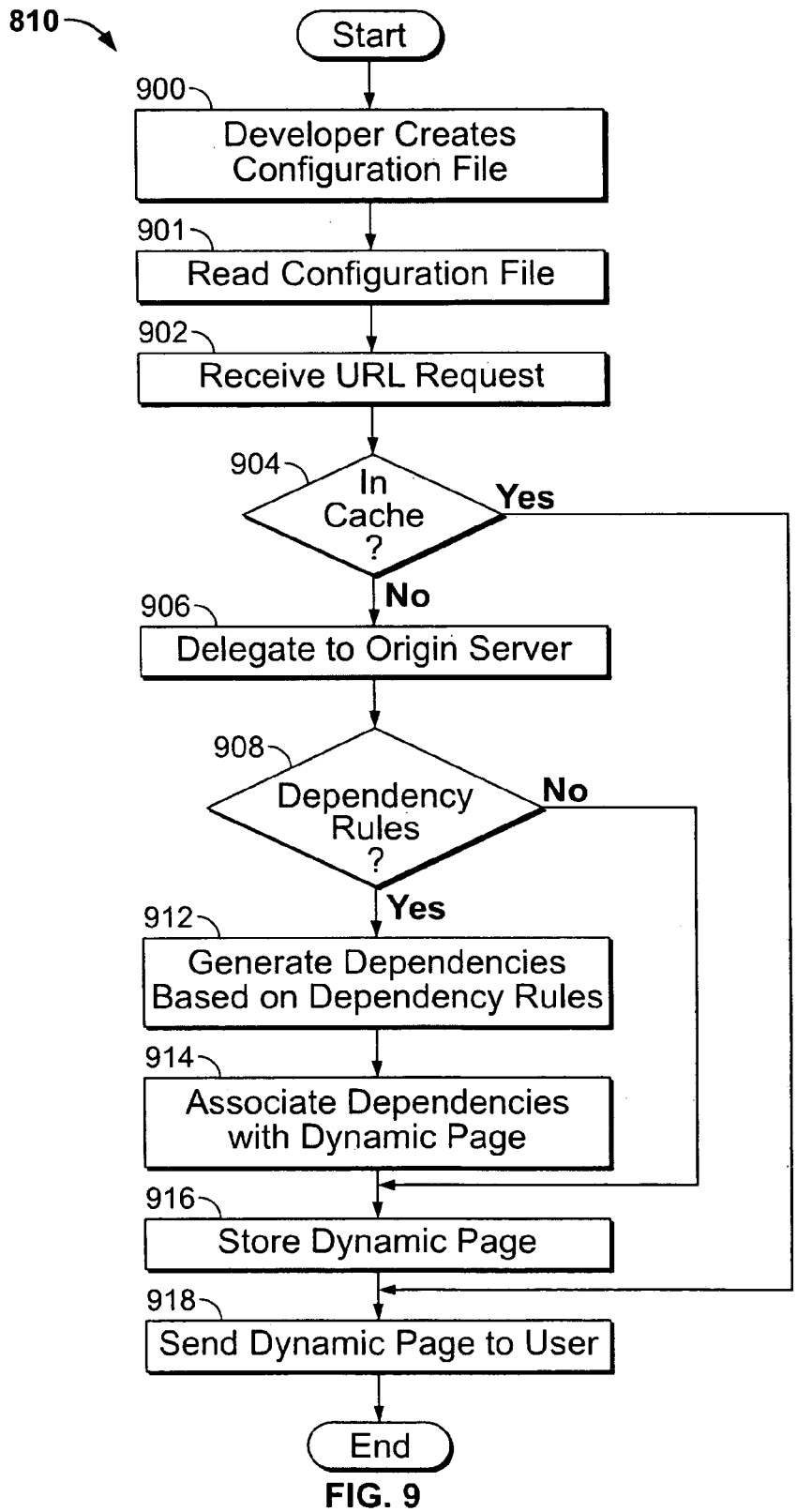
FIG. 9 is a block diagram of the process steps of a Request-Based dependency generator in accordance with the present invention.

FIG. 9 shows the basic process steps, including the steps of a Request-based dependency generator 810, in accordance with the present invention. To recognize which requested dynamic pages are to be cached, a developer has to create a configuration file in step 900 containing URL patterns and the associated dependency rules for such URL patterns. The configuration file created is then read in step 901. If the dynamic content cache receives a URL request (step 902), the Request-based dependency generator checks if the requested dynamic page is in cache memory 812, in step 904. If the requested page is found in cache, a "yes" outcome at the decision box 904, (e.g., by finding the file indexed by the complete URL address), a copy of the dynamic page stored in cache is then sent to the user in step 918.

If the dynamic page for the URL request is not found in cache, a "no" outcome at the decision box 904, the URL request is delegated to the origin server to be satisfied at step 906. Once the dynamic content cache receives the requested dynamic page, it checks if the configuration file contains dependency rules in step 908. (In the preferred embodiment, when dependency rules are contained in the configuration file, dependencies are not encoded in the dynamic page during the page generation process.) If dependencies are not found, that is, the dependencies are already encoded in the dynamic page received, (a "no" outcome at decision box 908), the dynamic content cache stores in cache the dynamic page received in step 916. A copy of the requested dynamic page is then sent to the requesting user at step 918.

Typically the dynamic page is stored, including the page's URL address, to facilitate retrieval in case the dynamic content cache receives a future request for the exact dynamic page. For example, the complete URL address "http://www.MyAuction.com/catItems.asp?CatID=131" is stored associating it with the corresponding dynamic page, so that future URL requests asking for such URL or dynamic page may easily be satisfied by getting a copy from cache rather than delegating the request to the origin server. Dynamic pages are not only stored containing dependencies but are stored and indexed in such as a way so that files having a particular dependency or having a particular URL address are easily found. One skilled in the art will recognize that the dependency rules need not necessarily be stored in the same file containing the dynamic page. It could be stored in a separate file or an in-process data structure as long as such dependency rules may be associated to that dynamic page.

Referring back to FIG. 9, if dependency rules are found in the configuration file, a "yes" outcome at the decision box 908, the Request-based dependency generator 810 generates dependencies based on the dependency rules contained in the configuration file in step 912. This configuration file was read earlier by the Request-based dependency generator in step 901. For example, if the URL request 602 found in FIG. 6A is received by the dynamic content cache ("http://www.myAuction.com/catItems.asp?CatID=131"), the appropriate dependencies 912, shown in Table VI, are generated based on lines 29 to 32 (in FIG. 7A) of the configuration file. These generated dependencies are then associated with the dynamic page received (step 914) and then stored in cache at step 916. The dynamic content cache then sends the requested dynamic page to the user at step 918.

One skilled in the art will also recognize that instead of determining whether the configuration file contains dependency rules, as shown in step 908, the system may check if the dynamic page received contains encoded or embedded dependencies and accordingly generate dependencies only if no encoded dependencies are found in the received dynamic page.

The second way of generating dependencies is via a script-based dependency generator 820 (shown in FIG. 8), which sits in-process with the page generator. In accordance with the present invention, scripts generating the dynamic pages (within the page generator) are modified such that dependencies are generated and embedded within the dynamic page generated. Table X is an example of dependencies appended at the end of a Web page.

TABLE X

Dependencies attached to end of dynamic page 600 in FIG. 6A

| Ln | Dependency Rules |
|---|---|
| 1 | <!—DynamicProxy |
| 2 | <DependencyRule>AuctionStatus(CatID=131) </DependencyRule> |
| 3 | <DependencyRule>Bid(CatID=131)</DependencyRule> |
| 4 | <DependencyRule>ItemChange(CatID=131)</DependencyRule> |
| 5 | <DependencyRule>ItemAdd(CatID=131)</DependencyRule> |
| 6 | —> |

The dynamic content cache looks for dependencies within specially delimited comments (lines 1 and 6) as shown in Table X. In the preferred embodiment, the dependencies are formatted, using HTML or XML, as a comment at the end of the generated page. One skilled in the art will also realize that Web pages that are not generated but manually marked-up or coded may also be appended with appropriate dependencies and accordingly be processed and cached by the present invention.

Referring back to FIG. 8, in accordance with the present invention, events are generated in a number of ways. Typically, because dynamic Web pages are based on dynamic data obtained from databases, changes in the data contained in the databases are usually considered as events. Examples of such events include but are not limited to, a database insert (e.g., an item is added to be auctioned), a database update (e.g. an item's title is changed), or a database deletion (e.g., item no longer available). The preferred embodiment supports Request-based event 818 generation, trigger-based event generation 824, polling event generation 826 from a DBMS (database management system), script-based event generation 822, and custom event generation 828.

FIG. 10A describes the Request-Based event generator 818, which sits in-process with the dynamic content cache and generates events based on URLs that are received and served by the dynamic content cache. In accordance with the invention, similar to a Request-based dependency generator, a configuration file (e.g., listed in FIGS. 7A and 7B) is needed by the Request-Based event generator 818. In FIG. 10A, it is assumed that the configuration file has been defined in the dynamic content cache. The configuration file is read in step 1002 to learn what events are to be generated for each URL pattern. When a URL request is received in step 1004, it is compared to the previously read patterns. The events to be generated are listed under EventRule elements. For example, if the URL received is "http://myAuction.com/updateItem.asp?ItemID=6113," (see line 52, FIG. 7B), the events to be generated are defined in lines 55 and 56. Thus, in this case an event message, e.g., contained Table IX, is generated in step 1006 and then sent to the change event evaluator 816 in step 1008.

The DBMS trigger-based generator 824, in FIG. 8, sits in-process with the DBMS 806 in databases that support triggers that are capable of sending messages to external programs. A trigger is an action that causes a procedure to be carried out automatically when a user attempts to modify data. In some database systems, such triggers may call external programs, such as an Event API (application program interface) that sends event messages to the change event evaluator 816. This implementation requires that triggers be created or modified such that the necessary events are generated and sent to the change event evaluator 816 when certain database change occurs. The trigger-based generator 824 may also be implemented using a configuration file describing simple trigger-to-event mappings, and describing URL patterns, if necessary.

The polling event generator 826 is preferably a process separate from the DBMS that polls the relevant tables for changes. This type of event generator is preferred for use in situations where the addition of triggers to the database is not possible. It is preferred that a configuration file be used which indicates the data changes to be monitored, including the events to be generated and incorporated into an event message. The polling event generator 826 is a software program that monitors changes on specific data, and, based on those changes, sends event messages containing events to the change event evaluator 816.

The script-based event generator 822 is a script-accessible component that generates events that correspond to URL patterns defined in the configuration file. Alternatively, the script-based dependency generator 822 is preferably a script-accessible component that has methods for recognizing events as the code encounters them, as well as a method that codes the dependencies as a formatted HTML or XML comment at the end of the generated page. The script-based dependency generator components sit in-process with the origin dynamic content server. Typically, this involves modifying the script(s) used in page generation such that when changes to databases or files are executed, a corresponding event message containing events is sent to the change event evaluator 816. What events are to be generated may be hard-coded into the script itself, rather than indicating it in the configuration file (e.g., FIG. 7B, lines 48 to 49, lines 55 to 56, and lines 62 and 63). However, for flexibility, the preferred embodiment is to have a configuration file indicating information to be monitored, including the appropriate events that have to be sent to the change event evaluator 816.

Finally, the custom event generator 828 is a software program that monitors changes in other data layouts or formats, or in conditions not covered by the above event generators. It may use a configuration file to indicate which particular data are to be monitored. In addition, a custom event generator 828 may support other event sources. In that case, an Application Programming Interface (API) is provided that facilitates the development of custom generators. In this way, a generator may be developed for any situation that might arise. The custom event generator is typically a software program written to monitor changes in specified data source and based on those changes, generate event messages to be sent to the change event evaluator 816.

One skilled in the art will recognize that depending on how events are generated, or the system implementation and design, the configuration file will vary for each event source.

FIG. 10B illustrates the steps of the change event evaluator 816 in updating the cache memory (or cache) 812 in FIG. 8. In the first step, the event processor 816 receives an event message containing events in step 1010. After receiving the event message 1010, the change event evaluator searches the cache memory 812, for dynamic pages containing dependencies matching any of the events received (step 1012). If any of the pages contain dependencies which match (i.e., event names, the number of parameters, the parameter names, and parameter values are identical) any of the events received, a "yes" outcome at the decision box 1014, the cache memory is updated in step 1016, for example, by refreshing or deleting such dynamic pages from memory and/or updating the appropriate indices. For example, if the event received is "AuctionStatus (CatID=513)", all dynamic pages containing the dependency, "AuctionStatus (CatID=513), are deleted from cache memory and the appropriate indices updated accordingly.

Figure 11:
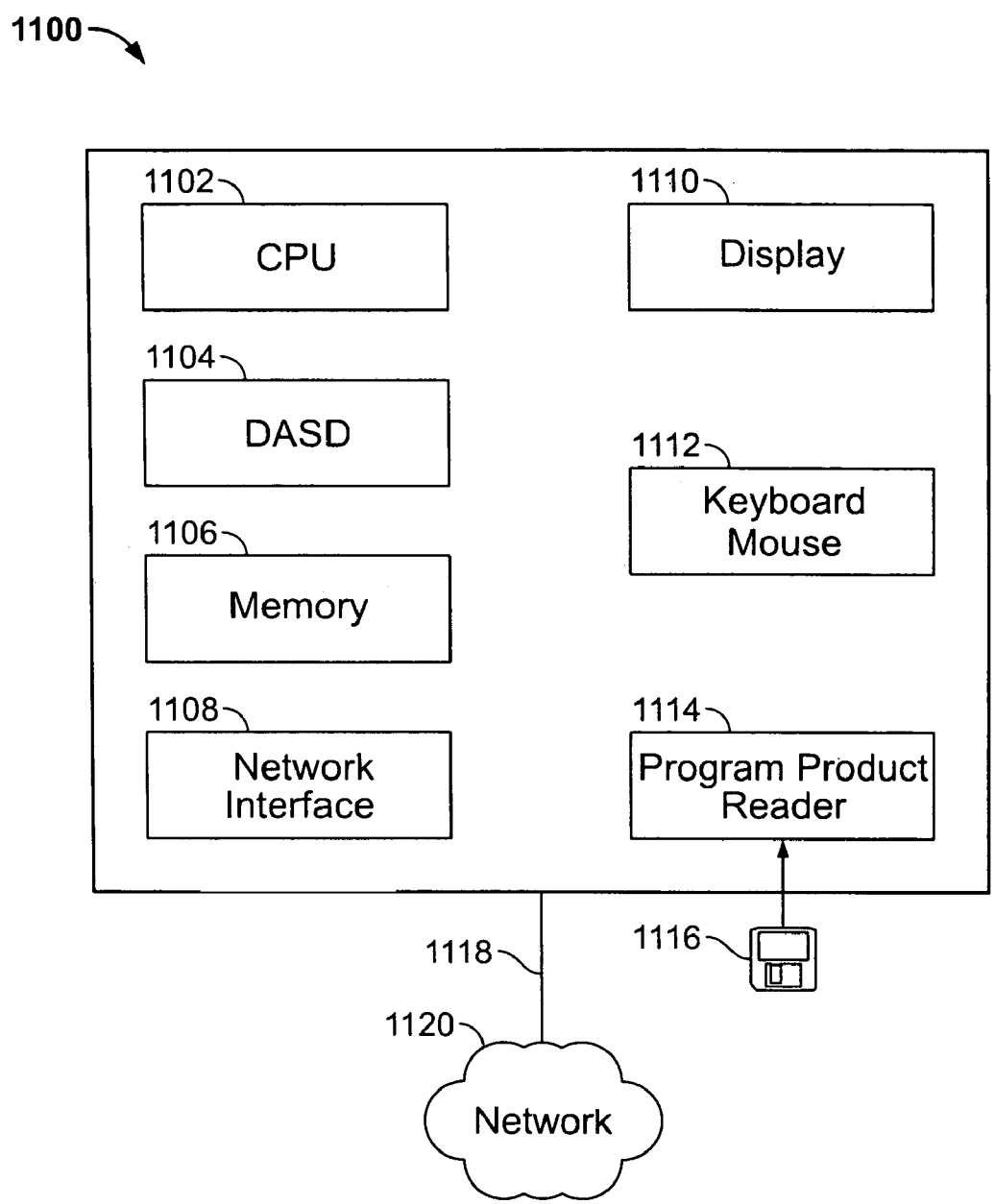
FIG. 11 is a block diagram representation of one of the computers in the systems illustrated in FIGS. 2A and 2B.

FIG. 11 is a block diagram of an exemplary computer 1100 such as might comprise any of the servers or computers 202, 206, 208, 210, 222, 226 or controllers 300. Each computer 1100 operates under control of a central processor unit (CPU) 1102, such as a "Pentium" microprocessor and associated integrated circuit chips, available from Intel Corporation of Santa Clara, Calif., USA. A computer user can input commands and data from a keyboard and mouse 1112 and can view inputs and computer output at a display 1110. The display is typically a video monitor or flat panel display device. The computer 1100 also includes a direct access storage device (DASD) 1104, such as a fixed hard disk drive. The memory 1106 typically comprises volatile semiconductor random access memory (RAM). Each computer preferably includes a program product reader 1114 that accepts a program product storage device 1116, from which the program product reader can read data (and to which it can optionally write data). The program product reader can comprise, for example, a disk drive, and the program product storage device can comprise removable storage media such as a floppy disk, an optical CD-ROM disc, a CD-R disc, a CD-RW disc, DVD disk, or the like. Each computer 1100 can communicate with the other connected computers over the network 1120 through a network interface 1108 that enables communication over a connection 1118 between the network and the computer.

The CPU 1102 operates under control of programming steps that are temporarily stored in the memory 1106 of the computer 1100. When the programming steps are executed, the pertinent system component performs its functions. Thus, the programming steps implement the functionality of the system components illustrated in FIGS. 2A and 2B. The programming steps can be received from the DASD 1104, through the program product 1116, or through the network connection 1118. The storage drive 1104 can receive a program product, read programming steps recorded thereon, and transfer the programming steps into the memory 1106 for execution by the CPU 1102. As noted above, the program product storage device can comprise any one of multiple removable media having recorded computer-readable instructions, including magnetic floppy disks, CD-ROM, and DVD storage discs. Other suitable program product storage devices can include magnetic tape and semiconductor memory chips. In this way, the processing steps necessary for operation in accordance with the invention can be embodied on a program product.

Alternatively, the program steps can be received into the operating memory 1106 over the network 1118. In the network method, the computer receives data including program steps into the memory 1106 through the network interface 1108 after network communication has been established over the network connection 1118 by well-known methods that will be understood by those skilled in the art without further explanation. The program steps are then executed by the CPU 1102 to implement the processing of the present invention.

It should be understood that all of the computers of the systems 200 and 201 illustrated in FIGS. 2A and 2B preferably have a construction similar to that shown in FIG. 11, so that details described with respect to the FIG. 11 computer 1100 will be understood to apply to all computers of the systems 200 and 201. Any of the computers can have an alternative construction, so long as they can communicate with the other computers and support the functionality described herein.

One skilled in the art will recognize that variations in the steps, as well as the order of execution, may be done and still make the invention operate in accordance with the features of the invention. Furthermore, one skilled in the art will realize that although the examples described herein generally refer to dynamic pages that are programmatically generated, static Web pages or manually coded Web pages may also be cached by the present invention following the operative steps and logic described herein.

The present invention has been described above in terms of a presently preferred embodiment so that an understanding of the present invention can be conveyed. There are, however, many configurations for network cache systems not specifically described herein but with which the present invention is applicable. The present invention should therefore not be seen as limited to the particular embodiments described herein, but rather, it should be understood that the present invention has wide applicability with respect to network cache systems generally. All modifications, variations, or equivalent arrangements and implementations that are within the scope of the attached claims should therefore be considered within the scope of the invention.

We claim:

1. A method of caching dynamic data pages, the method comprising:
    a) receiving a data page from an origin server, wherein said data page includes page dependency data that contains one or more dependencies such that each dependency indicates an underlying data source which said data page is dependent on, wherein said page dependency data are generated by a Request-Based dependency generator which uses a configuration file corresponding to the origin server, wherein the configuration file is the only configuration file corresponding to the origin server;
    b) storing said data page;
    c) storing said page dependency data;
    d) receiving an event;
    e) determining if said event changes an underlying data source corresponding to one of said page dependency data; and
    f) updating the cache by refreshing or deleting said data page if said event changes one of the page dependency data.

2. A method as defined in claim 1, where said page dependency data are written in HTML or XML.

3. A method as defined in claim 1, wherein said page dependency data are listed between specially delimited comments appended to the end of said data page.

4. A method as defined in claim 3, where said Request-Based dependency generator uses a URL request of said data page.

5. A method as defined in claim 1, where said page dependency data are generated by a script-based dependency generator.

6. A method as defined in claim 5, where said page dependency data are encoded in said data page by a script-based dependency generator.

7. A method as defined in claim 1, where said page dependency data are manually encoded into a data file.

8. A method as defined in claim 1, where said data page and said page dependency data are stored in one or more files.

9. A method as defined in claim 1, where said storing of said data page at the proxy is in response to data in a configuration file.

10. A method as defined in claim 1, where send event is received incorporated in an event message.

11. A method as defined in claim 1, where said event is written in HTML or XML.

12. A method as defined in claim 1, where said event came from a Request-Based event generator.

13. A method as defined in claim 12, where said Request-Based event generator uses a configuration file.

14. A method as defined in claim 12, where said Request-Based event generator uses a URL request of said data page.

15. A method as defined in claim 14, where said URL request is parsed to obtain parameters.

16. A method as defined in claim 14, where said tJRL request includes request header information.

17. A method as defined in claim 16, where said tJRL request is parsed to obtain parameters.

18. A method as defined in claim 1, where said event came from a script-based event generator.

19. A method as defined in claim 1, where said event came from a trigger-based event generator.

20. A method as defined in claim 1, where said event came from polling event generator.

21. A method as defined in claim 1, where said event came from a custom event generator.

22. A method as defined in claim 1, where said determination if said event changes one of the page dependency data associated with said data page is done by a change event evaluator.

23. A method as defined in claim 1, where said determination by the change event evaluator is done by matching said page dependency data with said event.

24. A method as defined in claim 1, where said event was generated by Request-Based event generator and sent to a change event evaluator.

25. A method as defined in claim 1, where said updating the cache involves keeping the index of URL addresses and page dependency data up-to-date.

26. A computer software product for use in a computer system that executes program steps recorded in a computer-readable media to perform a method for caching dynamic data pages comprising:
   a) a recordable media; and
   b) a program of computer-readable instructions executable by the computer to perform method steps comprising:
      i) receiving a data page from an origin server, wherein said data page includes page dependency data that contains one or more dependencies such that each dependency indicates an underlying data source which the said data page is dependent on, wherein said page dependency data are generated by a Request-Based dependency generator which uses a configuration file corresponding to the origin server, wherein the configuration file is the only configuration file corresponding to the origin server;
      ii) storing said data page;
      iii) storing said page dependency data;
      iv) receiving an event;
      v) determining if said event changes said one of the page dependency data associated with said data page; and
      vi) updating the cache by refreshing or deleting said data page if said event changes said one of the page dependency data associated with said data page.

27. A proxy server system that provides stored data files without requesting data files from the origin web server, comprising:
   a) a central processing unit that can establish communication with a user computer;
   b) a storage device;
   c) a processor connected to the storage device wherein the storage device stores:
   d) the processor is operative with said program component to:
      i) receive a data page from an origin server, wherein said data page includes page dependency data that contains one or more dependencies such that each dependency indicates an underlying data source which the said data page is dependent on, wherein said page dependency data are generated by a Request-Based dependency generator which uses a configuration file corresponding to the origin server, wherein the configuration file is the only configuration file corresponding to the origin server;
      ii) store said data page;
      iii) store said page dependency data;
      iv) receive an event;
      v) determine if said event changes said one of the page dependency data associated with said data page; and
      vi) update the cache by refreshing or deleting said data page if said event changes said one of the page dependency data associated with said data page.

28. A method for caching a dynamic web page, the method comprising:
   receiving a request for the dynamic web page at an origin server, the request sent from a dynamic content cache;
   reading a configuration file created for the origin server, the configuration file containing one or more rules to be applied to dynamic web pages relating to the origin server in order to generate dependencies, wherein the configuration file is the only configuration file for the origin server;
   generating the dynamic web page;
   generating one or more dependencies for the dynamic web page by applying the one or more rules to the dynamic web page;
   associating the one or more dependencies with the dynamic web page; and
   sending the dynamic web page and the associated dependencies to the dynamic content cache for storage.

29. The method of claim 28, wherein said one or more rules include URL pattern matching.

30. The method of claim 28, wherein said associating includes appending the one or more dependencies at the end of the dynamic web page.

31. The method of claim 28, wherein the one or more dependencies for the dynamic web page do not include dependencies for at least one object which is to be displayed when the dynamic web page is loaded by a browser.

32. The method of claim 31, wherein said dependencies for at least one object which are not included in the one or more dependencies for the dynamic web page are determined by one or more rules indicating non-cacheable objects, the rules included in the configuration file.

33. The method of claim 28, wherein the one or more dependencies are written in XML.

* * * * *